United States Patent
Tang et al.

(10) Patent No.: US 11,863,969 B2
(45) Date of Patent: Jan. 2, 2024

(54) COMMUNICATION APPARATUS AND CONTROL APPARATUS

(71) Applicant: Sony Corporation, Tokyo (JP)

(72) Inventors: Yifu Tang, Tokyo (JP); Hiromasa Uchiyama, Tokyo (JP); Naoki Kusashima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 314 days.

(21) Appl. No.: 17/281,584

(22) PCT Filed: Oct. 9, 2019

(86) PCT No.: PCT/JP2019/039762
§ 371 (c)(1),
(2) Date: Mar. 31, 2021

(87) PCT Pub. No.: WO2020/090387
PCT Pub. Date: May 7, 2020

(65) Prior Publication Data
US 2021/0392547 A1    Dec. 16, 2021

(30) Foreign Application Priority Data

Oct. 31, 2018  (JP) .................. 2018-205063

(51) Int. Cl.
*H04W 28/16*    (2009.01)
*H04W 4/46*    (2018.01)

(52) U.S. Cl.
CPC .............. *H04W 28/16* (2013.01); *H04W 4/46* (2018.02)

(58) Field of Classification Search
None
See application file for complete search history.

(56) References Cited

U.S. PATENT DOCUMENTS

| | | |
|---|---|---|
| 2018/0213379 A1* | 7/2018 | Xiong ..................... H04W 4/70 |
| 2019/0132832 A1* | 5/2019 | Uchiyama ............... H04W 4/40 |
| 2020/0092685 A1* | 3/2020 | Fehrenbach .......... H04W 72/23 |
| 2020/0314612 A1* | 10/2020 | Kang ...................... H04W 4/70 |
| 2021/0153170 A1* | 5/2021 | Chen ................. H04W 72/0446 |
| 2021/0212030 A1* | 7/2021 | Selvanesan ........... H04W 72/02 |

(Continued)

FOREIGN PATENT DOCUMENTS

| | | |
|---|---|---|
| CN | 105657842 A | 6/2016 |
| CN | 107466451 A | 12/2017 |

(Continued)

OTHER PUBLICATIONS

International Search Report and Written Opinion dated Nov. 19, 2019, received for PCT Application PCT/JP2019/039762, Filed on Oct. 9, 2019, 10 pages including English Translation.

(Continued)

*Primary Examiner* — Hassan A Phillips
*Assistant Examiner* — Gautam Sharma
(74) *Attorney, Agent, or Firm* — XSENSUS LLP

(57) ABSTRACT

Provided is a communication apparatus (200) including: an acquisition unit (241) that acquires, from a base station apparatus (100), information for operating as a master for controlling a sidelink communication between other apparatuses; and a control unit (240) that performs a process for operating as the master on the basis of the information acquired by the acquisition unit.

16 Claims, 21 Drawing Sheets

(56) References Cited

U.S. PATENT DOCUMENTS

| | | | | |
|---|---|---|---|---|
| 2021/0392547 A1* | 12/2021 | Tang | .................... | H04W 28/16 |
| 2022/0104179 A1* | 3/2022 | Masini | .................. | H04W 76/14 |
| 2022/0408413 A1* | 12/2022 | Tang | .................... | H04W 16/06 |
| 2023/0171050 A1* | 6/2023 | Tanaka | .................. | H04W 92/20 370/328 |

FOREIGN PATENT DOCUMENTS

| | | |
|---|---|---|
| CN | 107852777 A | 3/2018 |
| CN | 108370565 A | 8/2018 |
| CN | 108605213 A | 9/2018 |
| JP | 2017-208796 A | 11/2017 |
| WO | WO-2016119674 A1 | 8/2016 |
| WO | WO-2017011942 A1 | 1/2017 |
| WO | WO-2017135028 A1 | 8/2017 |
| WO | WO-2017171909 A1 | 10/2017 |
| WO | WO-2018006417 A1 | 1/2018 |
| WO | 2018/064179 A1 | 4/2018 |
| WO | 2018/084880 A1 | 5/2018 |
| WO | WO-2018186667 A1 | 10/2018 |

OTHER PUBLICATIONS

Sony, "Discussion on Mode 2 Resource Allocation for NR V2X Communication", 3GPP TSG RAN WG1 Meeting #94bis, R1-1810638, Oct. 8-12, 2018, 5 pages.

AT&T, "Sidelink Based Synchronization Mechanism", 3GPP TSG RAN WG1 Meeting #94, R1-1809068, Aug. 20-24, 2018, 6 pages.

Sony, "Discussion on NR V2X Resource Allocation Mechanism", 3GPP TSG RAN WG1 Meeting #95, R1-1813139, Nov. 12-16, 2018, 5 pages.

NTT Docomo, Inc, "Resource allocation mechanism", 3GPP TSG RAN WG1 Meeting #94, R1-1809159, Aug. 20-24, 2018, total 7 pages, XP055859033, Gothenburg, Sweden. Retrieved from the Internet: URL: http://www.3gpp.org/ftp/tsg%5Fran/WG1%5FRL1/TSGR1%5F94/Docs/R1%2D1809159%2Ezip>.

CATT, "Mode 2 Resource Allocation", 3GPP TSG-RAN WG2 Meeting #103bis, R2-1813725, Chengdu, China, Oct. 8-12, 2018.

* cited by examiner

US 11,863,969 B2

COMMUNICATION APPARATUS AND CONTROL APPARATUS

CROSS-REFERENCE TO RELATED APPLICATIONS

The present application is based on PCT filing PCT/JP2019/039762, filed Oct. 9, 2019, which claims priority to JP 2018-205063, filed Oct. 31, 2018, the entire contents of each are incorporated herein by reference.

TECHNICAL FIELD

The present disclosure relates to a communication apparatus and a control apparatus.

BACKGROUND ART

In recent years, expectations have been running high for in-vehicle communication (V2X communication) to achieve automatic driving in the future. The V2X communication is an abbreviation of vehicle to X communication, and refers to a system in which a vehicle and "something" communicate with each other. Here, examples of "something" include a vehicle (Vehicle), a facility (Infrastructure), a network (Network), and a pedestrian (Pedestrian) (V2V, V2I, V2N, and V2P). For example, Patent Literature 1 discloses an example of techniques relating to the V2X communication.

Further, as wireless communication for vehicles, development of 802.11p-based DSRC (Dedicated Short Range Communication) has mainly advanced so far; however, in recent years, standardization of "LTE-based V2X", which is LTE-based in-vehicle communication, has been carried out. The LTE-based V2X communication supports exchanges or the like of basic safety messages, etc.

CITATION LIST

Patent Literature

PTL 1: Japanese Unexamined Patent Application Publication No. 2017-208796

SUMMARY OF THE INVENTION

Problems to be Solved by the Invention

Meanwhile, regarding NR V2X communication using NR (New Radio), it is demanded that high reliability and a latency requirement be satisfied, and a currently available V2X communication method is unable to satisfy the high reliability and latency requirement.

Accordingly, the present disclosure proposes a novel and improved communication apparatus and control apparatus that make it possible to perform V2X communication effectively in NR V2X communication.

Means for Solving the Problems

According to the present disclosure, provided is a communication apparatus including: an acquisition unit that acquires, from a base station apparatus, information for operating as a master for controlling a sidelink communication between other apparatuses; and a control unit that performs a process for operating as the master on the basis of the information acquired by the acquisition unit.

Further, according to the present disclosure, provided is a control apparatus including: a control unit that sets information for a communication apparatus to operate as a master for controlling a sidelink communication between other apparatuses; and a communication unit that transmits the information set by the control unit to the communication apparatus to allow the communication apparatus to operate as the master.

Further, according to the present disclosure, provided is a communication apparatus including: an acquisition unit that acquires, from a communication apparatus that operates as a master for controlling a sidelink communication with another apparatus, information related to the sidelink communication; and a control unit that performs a process related to the sidelink communication on the basis of the information acquired by the acquisition unit.

MODES FOR CARRYING OUT THE INVENTION

The following describes some preferred embodiments of the present disclosure in detail with reference to the accompanying drawings. It is to be noted that, in this specification and the appended drawings, components that have substantially the same function and configuration are denoted with the same reference signs, thereby refraining from repeatedly describing these components.

It is to be noted that description is given in the following order.

Figure 1:
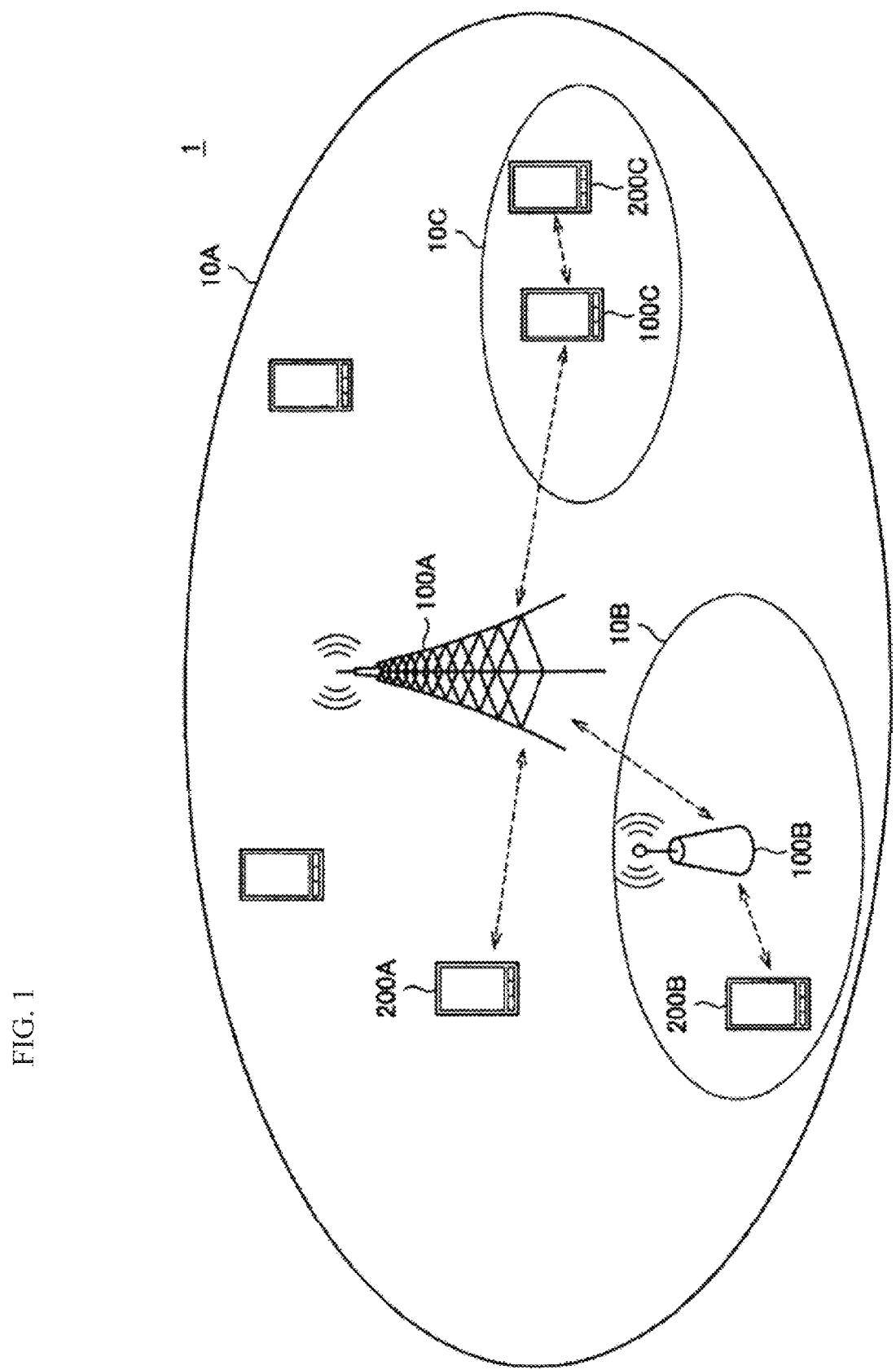
FIG. 1 is an explanatory diagram for describing an example of a schematic configuration of a system according to an embodiment of the present disclosure.

1. Configuration Example
   1.1. Example of System Configuration
   1.2. Configuration Example of Base Station
   1.3. Configuration Example of Terminal Apparatus
2. V2X Communication
3. Scheme of Resource Allocation to Sidelink
4. Control of Sidelink V2V Communication between Sender and Receiver
5. Application Examples
   5.1. Application Example related to Base Station
   5.2. Application Example related to Terminal apparatus
6. Conclusion 1. Configuration Example 1.1. Example of System Configuration First, an example of a schematic configuration of a system 1 according to an embodiment of the present disclosure will be described with reference to FIG. 1. FIG. 1 is an explanatory diagram for describing an example of a schematic configuration of the system 1 according to the embodiment of the present disclosure.

As illustrated in FIG. 1, the system 1 includes a wireless communication apparatus 100 and a terminal apparatus 200. Here, the terminal apparatus 200 is also referred to as a user. The user may also be referred to as a UE. A wireless communication apparatus 100C is also referred to as a UE-Relay. Here, the UE may be a UE defined in LTE or LTE-A, and the UE-Relay may be a Prose UE to Network Relay discussed in 3GPP, or may more generally represent a communication apparatus.

(1) Wireless Communication Apparatus 100

The wireless communication apparatus 100 is an apparatus that provides wireless communication service to a subordinate apparatus. For example, a wireless communication apparatus 100A is a base station of a cellular system (or a mobile communication system). The base station 100A performs wireless communication with an apparatus (for example, a terminal apparatus 200A) located inside a cell 10A of the base station 100A. For example, the base station 100A transmits a downlink signal to the terminal apparatus 200A and receives an uplink signal from the terminal apparatus 200A.

The base station 100A is logically coupled to another base station by, for example, an X2 interface, and is able to transmit and receive control information and the like. Furthermore, the base station 100A is logically coupled to a so-called core network (illustration omitted) by, for example, an Si interface, and is able to transmit and receive control information and the like. Note that communications between these apparatuses may be relayed physically by various apparatuses.

Here, the wireless communication apparatus 100A illustrated in FIG. 1 is a macro cell base station, and the cell 10A is a macro cell. Meanwhile, wireless communication apparatuses 100B and 100C are master devices that operate small cells 10B and 10C, respectively. As one example, the master device 100B is a fixedly installed small cell base station. The small cell base station 100B establishes a wireless backhaul link with the macro cell base station 100A, and establishes an access link with one or more terminal apparatuses (for example, a terminal apparatus 200B) in the small cell 10B. Note that the wireless communication apparatus 100B may be a relay node defined by 3GPP. The master device 100C is a dynamic AP (access point). The dynamic AP 100C is a mobile device that dynamically operates the small cell 10C. The dynamic AP 100C establishes a wireless backhaul link with the macro cell base station 100A, and establishes an access link with one or more terminal apparatuses (for example, a terminal apparatus 200C) in the small cell 10C. The dynamic AP 100C may be, for example, a terminal apparatus equipped with hardware or software that is operable as a base station or a wireless access point. The small cell 10C in this case is a localized network (Localized Network/Virtual Cell) that is formed dynamically.

The cell 10A may be operated in accordance with any wireless communication scheme such as, for example, LTE, LTE-A (LTE-Advanced), LTE-ADVANCED PRO, GSM (registered trademark), UMTS, W-CDMA, CDMA2000, WiMAX, WiMAX2, or IEEE802.16.

Note that the small cell is a concept that may encompass various types of cells that are smaller than the macro cell and are placed to overlap or not to overlap the macro cell (for example, a femtocell, a nanocell, a picocell, a microcell, and the like). In one example, the small cell is operated by a dedicated base station. In another example, the small cell is operated by a terminal serving as a master device temporarily operating as a small cell base station. The so-called relay node can also be regarded as a form of a small cell base station. A wireless communication apparatus that functions as a master station of the relay node is also referred to as a donor base station. The donor base station may represent a DeNB in LTE, or may more generally represent a master station of a relay node.

(Terminal Apparatus 200)

The terminal apparatus 200 is able to perform communication in a cellular system (or mobile communication system). The terminal apparatus 200 performs wireless communication with a wireless communication apparatus (for example, the base station 100A, the master device 100B or 100C) of the cellular system. For example, the terminal apparatus 200A receives a downlink signal from the base station 100A and transmits an uplink signal to the base station 100A.

Further, the terminal apparatus 200 is not limited to the so-called UEs only, and, for example, so-called low cost terminals (Low cost UEs) including an MTC terminal, an eMTC (Enhanced MTC) terminal, an NB-IoT terminal, and the like may be applied. Further, an infrastructure terminal such as an RSU (Road Side Unit) or a terminal such as CPE (Customer Premises Equipment) may also be applied.

(3) Supplement

The schematic configuration of the system 1 has been described above. However, the present technology is not limited to the example illustrated in FIG. 1. For example, as the configuration of the system 1, a configuration without a master device, SCE (Small Cell Enhancement), a HetNet (Heterogeneous Network), an MTC network, and the like are adoptable. Furthermore, as another example of the configuration of the system 1, a master device may be coupled to a small cell to construct a cell subordinate to the small cell.

1.2. Configuration Example of Base Station

Figure 2:
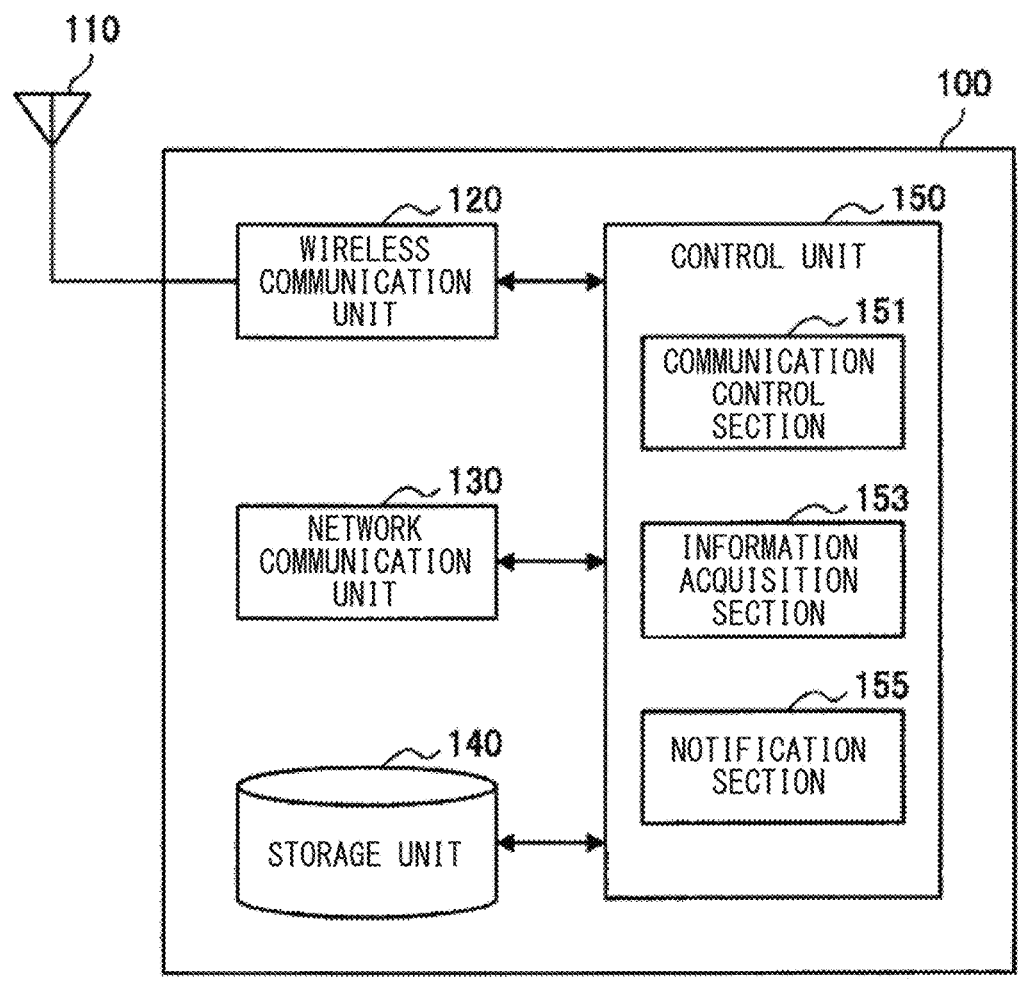
FIG. 2 is a block diagram illustrating an example of a configuration of a base station according to the embodiment.

Next, a configuration of a base station 100 according to an embodiment of the present disclosure will be described with reference to FIG. 2. FIG. 2 is a block diagram illustrating an example of the configuration of the base station 100 according to the embodiment of the present disclosure. Referring to FIG. 2, the base station 100 includes an antenna unit 110, a wireless communication unit 120, a network communication unit 130, a storage unit 140, and a control unit 150.

(1) Antenna Unit 110

The antenna unit 110 radiates a signal outputted by the wireless communication unit 120 into a space as a radio wave. Further, the antenna unit 110 converts a radio wave in the space into a signal, and outputs the signal to the wireless communication unit 120.

(2) Wireless Communication Unit 120

The wireless communication unit 120 transmits and receives signals. For example, the wireless communication unit 120 transmits a downlink signal to a terminal apparatus, and receives an uplink signal from the terminal apparatus.

(3) Network Communication Unit 130

The network communication unit 130 transmits and receives information. For example, the network communication unit 130 transmits information to other nodes and receives information from the other nodes. For example, the other nodes include other base stations and core network nodes.

It is to be noted that as described above, in the system 1 according to the present embodiment, there are cases where a terminal apparatus operates as a relay terminal to relay communication between a remote terminal and a base station. In such cases, for example, the wireless communication apparatus 100C corresponding to the relay terminal does not have to include the network communication unit 130.

(4) Storage Unit 140

The storage unit 140 temporarily or permanently stores a program for operation of the base station 100 and various data.

(5) Control Unit 150

The control unit 150 provides various functions of the base station 100. The control unit 150 includes a communication control section 151, an information acquisition section 153, and a notification section 155. It is to be noted that the control unit 150 may further include additional components other than these components. That is, the control unit 150 may also perform an operation other than the operations of these components.

The communication control section 151 performs various processes relating to control of wireless communication with the terminal apparatus 200 via the wireless communication unit 120. Further, the communication control section 151 performs various processes relating to control of communication with other nodes (for example, other base stations, core network nodes, etc.) via the network communication unit 130.

The information acquisition section 153 acquires various information from the terminal apparatus 200 and other nodes. The acquired information may be used for, for example, control of wireless communication with the terminal apparatus, control relating to cooperation with other nodes, or the like.

The notification section 155 notifies the terminal apparatus 200 and other nodes of various information. As a specific example, the notification section 155 may notify a terminal apparatus in the cell of various information for the terminal apparatus to perform wireless communication with the base station. As another example, the notification section 155 may notify information acquired from a terminal apparatus in the cell to another node (for example, another base station).

1.3. Configuration Example of Terminal Apparatus

Figure 3:
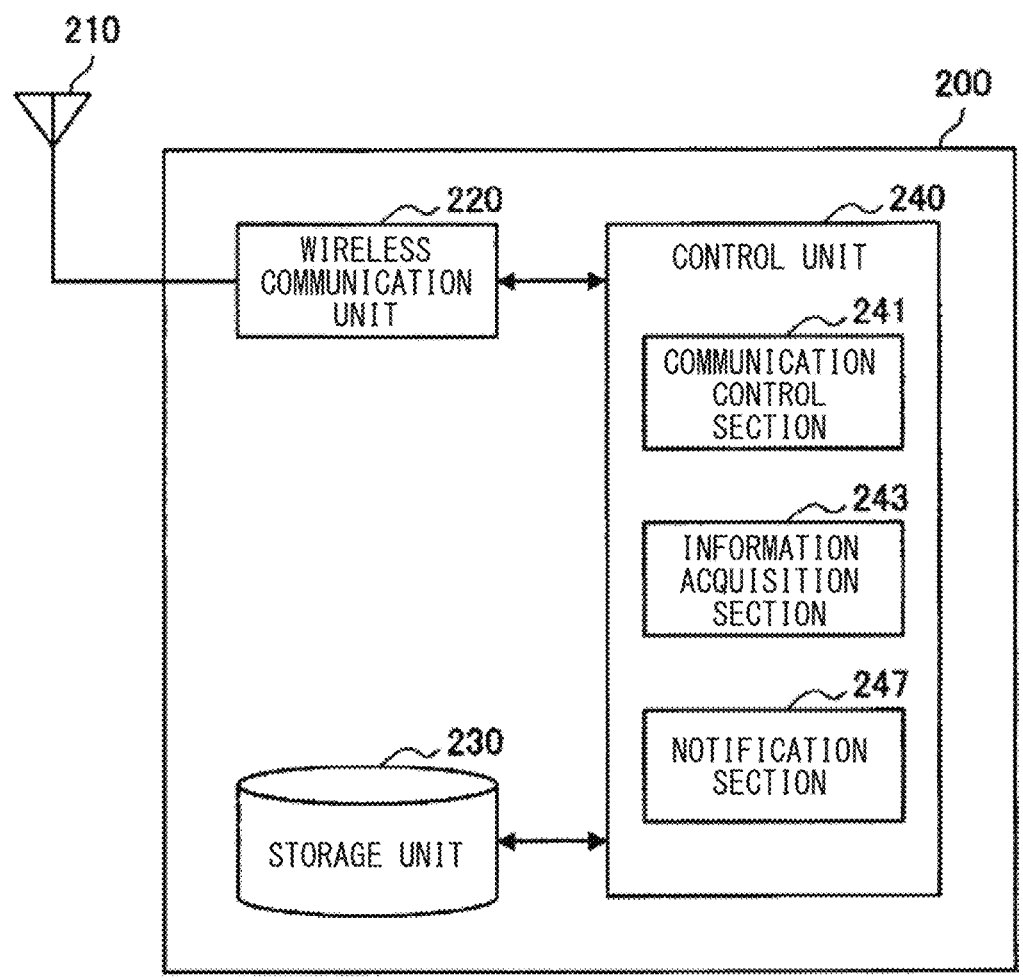
FIG. 3 is a block diagram illustrating an example of a configuration of a terminal apparatus according to the embodiment.

Next, an example of a configuration of the terminal apparatus 200 according to the embodiment of the present disclosure will be described with reference to FIG. 3. FIG. 3 is a block diagram illustrating an example of the configuration of the terminal apparatus 200 according to the embodiment of the present disclosure. As illustrated in FIG. 3, the terminal apparatus 200 includes an antenna unit 210, a wireless communication unit 220, a storage unit 230, and a control unit 240.

(1) Antenna Unit 210

The antenna unit 210 radiates a signal outputted by the wireless communication unit 220 into a space as a radio wave. Further, the antenna unit 210 converts a radio wave in the space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

Further, in the system 1 according to the present embodiment, there are cases where the terminal apparatus 200 directly communicates with another terminal apparatus 200 without intervention by the base station 100. In such cases, the wireless communication unit 220 may transmit and receive sidelink signals to and from the other terminal apparatus 200.

(3) Storage Unit 230

The storage unit 230 temporarily or permanently stores a program for operation of the terminal apparatus 200 and various data.

(4) Control Unit 240

The control unit 240 provides various functions of the terminal apparatus 200. For example, the control unit 240 includes a communication control section 241, an information acquisition section 243, and a notification section 247. It is to be noted that the control unit 240 may further include additional components other than these components. That is, the control unit 240 may also perform an operation other than the operations of these components.

The communication control section 241 performs various processes relating to control of wireless communication with the base station 100 and another terminal apparatus 200 via the wireless communication unit 220. For example, the communication control section 241 may reserve resources for use in sending packets. Further, the communication control section 241 may select some of the reserved resources and exercise control to cause packets to be transmitted using the selected resources.

Further, the communication control section 241 may perform a predetermined determination on the basis of information acquired from the base station 100 or another terminal apparatus 200. As a more specific example, the communication control section 241 may determine whether or not a packet is transmittable to another terminal apparatus 200. Further, at this time, the communication control section 241 may determine whether or not to drop the packet to be transmitted to the other terminal apparatus 200.

The information acquisition section 243 acquires various information from the base station 100 and another terminal apparatus 200. As a specific example, the information acquisition section 243 may acquire information (for example, a reception capability or the like) relating to another terminal apparatus 200 from the other terminal apparatus 200. Further, the information acquisition section 243 may acquire various kinds of information for selecting a resource to be used for communication with another terminal apparatus 200 from the base station 100 or the other terminal apparatus 200. As a more specific example, the information acquisition section 243 may acquire information regarding a resource reserved by another terminal apparatus 200 from the other terminal apparatus 200.

The notification section 247 notifies the base station 100 and other terminal apparatuses 200 of various information. As a specific example, the notification section 247 may notify another terminal apparatus 200 (for example, the terminal apparatus 200 to which data or packets are to be transmitted) of information regarding the data or packets to be transmitted. Further, the notification section 247 may notify the other terminal apparatus 200 of information regarding a resource reserved for use in transmitting the packets.

2. V2X Communication

Figure 4:
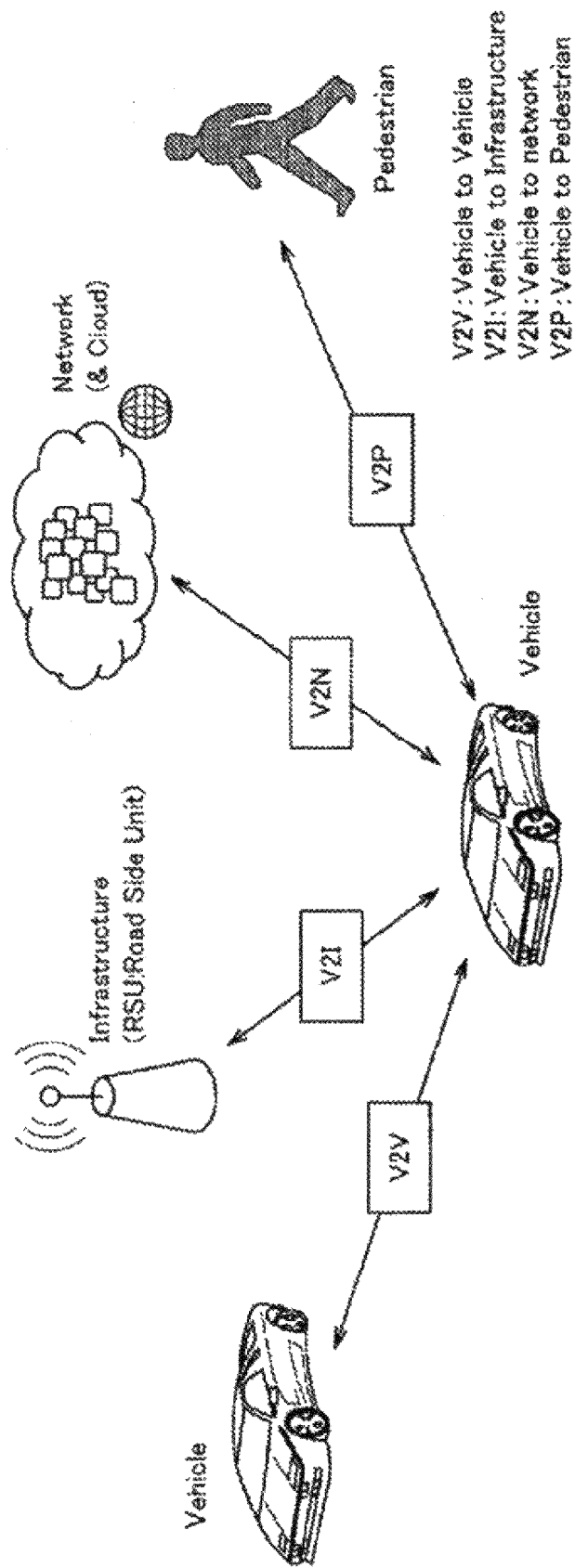
FIG. 4 is a diagram illustrating an outline of V2X communication.

Next, an outline of V2X communication will be described. The V2X communication is an abbreviation of vehicle to X communication, and refers to a system in which a vehicle and "something" communicate with each other. FIG. 4 is a diagram illustrating an outline of the V2X communication. Here, examples of "something" include, as illustrated in FIG. 4, for example, a vehicle (Vehicle), a facility (Infrastructure), a network (Network), and a pedestrian (Pedestrian) (V2V, V2I, V2N, and V2P).

(Overall View of V2X Communication)

Figure 5:
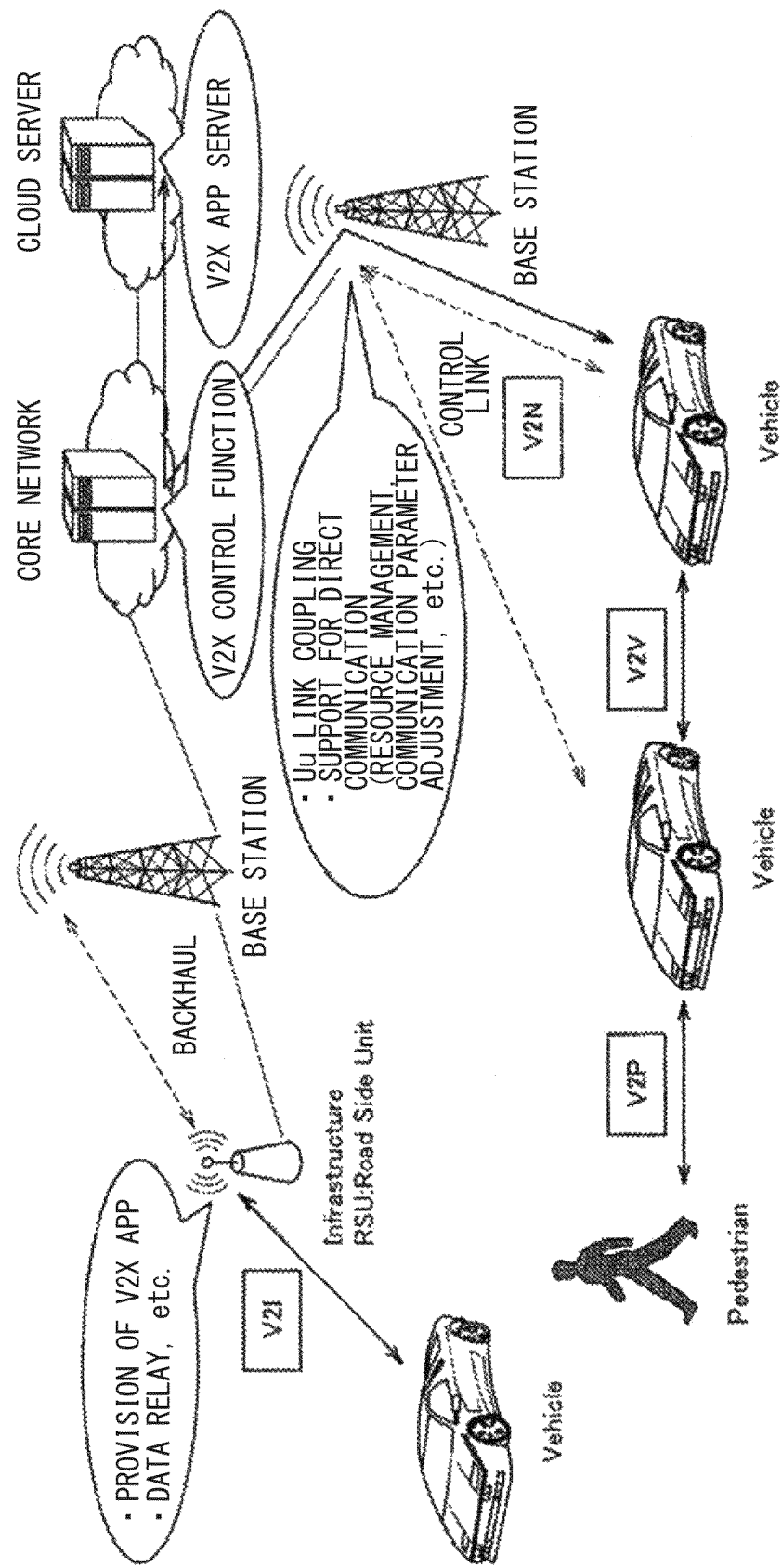
FIG. 5 is an explanatory diagram for describing an example of an overall view of V2X communication.

Further, FIG. 5 is an explanatory diagram for describing an example of an overall view of the V2X communication. In the example illustrated in FIG. 5, an application server (APP server) of V2X is owned as a cloud server, and the application server performs control of the V2X communication on the core network side. The base station performs communication control of direct communication such as the V2V communication or the V2P communication while performing a Uu link communication with a terminal apparatus. Further, besides the base station, an RSU (Road Side Unit) is disposed as a roadside infrastructure (Infrastructure). As the RSUs, two types, i.e., a base station type RSU and a UE type RSU are possible. The RSU provides V2X applications (V2X APP) and supports data relays or the like.

(Use Cases of V2X Communication)

Figure 6:
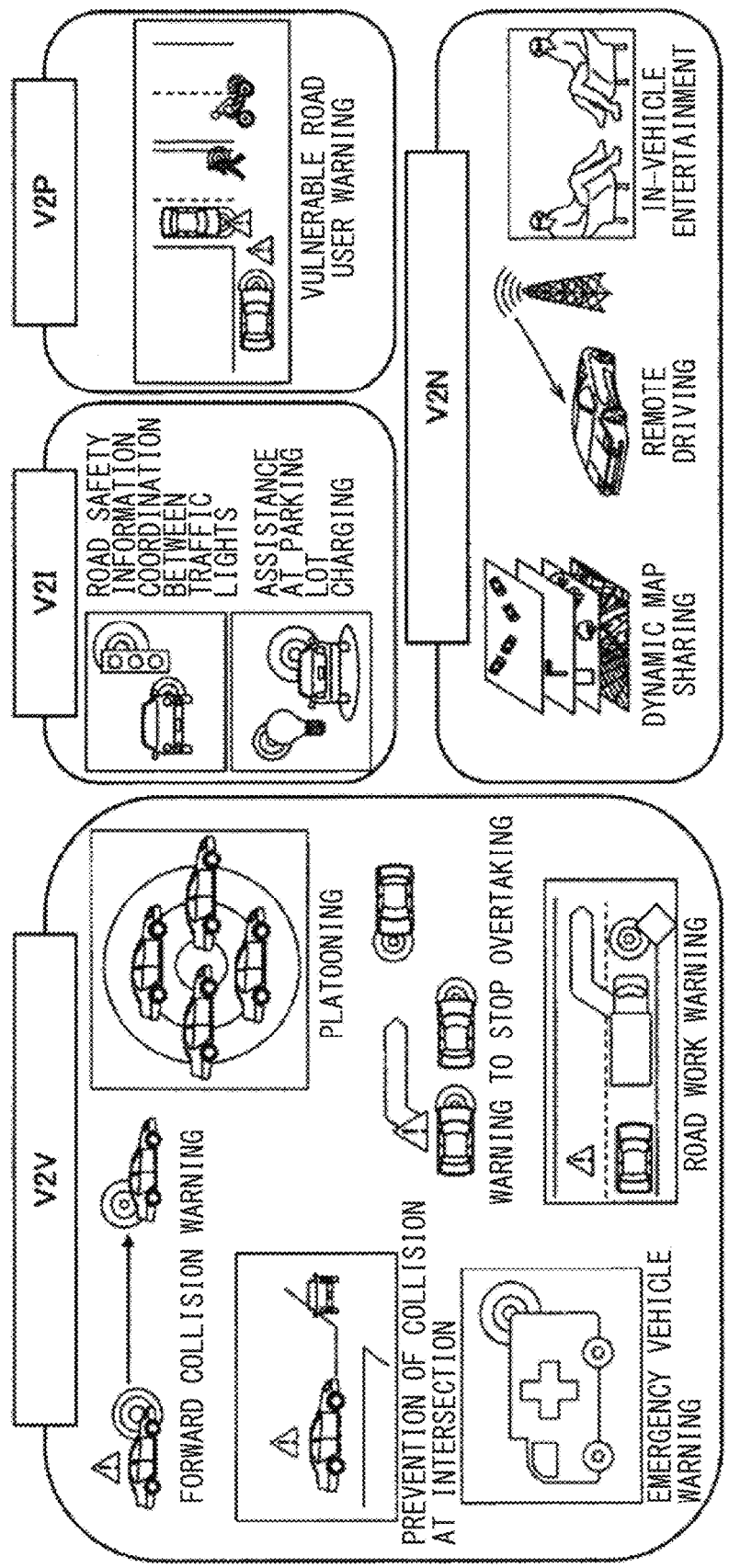
FIG. 6 is a diagram illustrating an example of use cases of V2X communication.

As wireless communication for automobiles, development of 802.11p-based DSRC (Dedicated Short Range Communication) has mainly been advanced so far; however, in recent years, standardization of "LTE-based V2X (LTE-based V2X communication)", which is LTE-based in-vehicle communication, has been carried out. The LTE-based V2X communication supports exchanges or the like of basic safety messages, etc. Meanwhile, in an attempt to achieve further improvement of V2X communication, NR V2X communication using 5G technology (NR: New Radio) has been studied in recent years. For example, FIG. 6 is a diagram illustrating an example of use cases of the V2X communication.

The NR V2X communication supports new use cases that involve high reliability, low delay, high speed communication, and high capacity, which have been difficult to support with the LTE-based V2X. One specific example is, among the examples illustrated in FIG. 6, the provision of a dynamic map, remote driving, or the like, for example. Other examples include sensor data sharing where sensor data is exchanged between vehicles and between a road and a vehicle, and platooning use cases intended for platooning. Such use cases and requirements for the NR V2X communication are specified in 3GPP TR22. 886. For reference purposes, an outline of an example of the use cases will be described below.

(1) Vehicles Platooning

This is a use case of platooning in which two or more vehicles make up a platoon and travel in the same direction, and in which information for controlling the platooning is exchanged between a vehicle leading the platooning and other vehicles. The exchanges of the information make it possible to, for example, reduce vehicle-to-vehicle distances in the platooning.

(2) Extended Sensors

This is a use case that allows sensor-related information (Raw data before data processing and data after processing) to be exchanged between vehicles. The sensor information is collected through a local sensor, a live video image (for example, a live video image with a surrounding vehicle, an RSU, and a pedestrian), a V2X application server, and the like. By exchanging such information, a vehicle is able to obtain information that is not obtainable from its own sensor information, thereby becoming able to notice/recognize a wider range of environments. It is to be noted that in this use case, a high data rate is demanded of communication because a large number of pieces of information have to be exchanged.

(3) Advanced Driving

This is a use case that enables semi-automatic driving and fully automatic driving. In this use case, an RSU shares its noticed/recognized information obtained from the RSU's own sensor or the like with surrounding vehicles, thereby allowing each of the vehicles to adjust its track and operation in synchronization with and in cooperation with the other vehicles. Further, it is also possible for each of the vehicles to share an aim or intention of the driving with the surrounding vehicles.

(4) Remote Driving

This is a use case that allows a remote controller or a V2X application to perform remote control. Remote operation is used in a case where driving is performed by another person in place of a person who has difficulty in driving, or for operation of a vehicle in a hazardous region or the like. It is also possible to apply, for example, cloud computing-based control to public transportation where routes and roads to travel are determined to some extent. In this use case, high reliability and low transmission delay are demanded of communication.

(Physical Layer Enhancement)

To achieve the requirements described above, further enhancement of a physical layer from LTE V2X is necessary. Links to be targeted are a Uu link and a PC5 link (sidelink). The Uu link is a link between an infrastructure such as a base station or an RSU (Road Side Unit) and a terminal apparatus. Further, the PC5 link (sidelink) is a link between terminal apparatuses. Main points of enhancement are listed below.

Examples of enhancement include the following.
Channel format
Sidelink feedback communication
Sidelink resource allocation scheme
Vehicle position information estimation technique
Relay communication between terminals
Support for unicast communication and multicast communication
Multicarrier communication and carrier aggregation
MIMO/beamforming
High frequency support (example: 6 GHz or higher)

Examples of the channel format include Flexible numerology, short TTI (Transmission Time Interval), multi-antenna support, Waveform, and the like. Further, examples of the sidelink feedback communication include HARQ, CSI (Channel Status Information), and the like.

(V2X Operation Scenario)

An example of V2X communication operation scenarios will be described below. V2N communication includes only DL/UL communication between a base station and a terminal apparatus, and is thus simple. In contrast, in V2V communication, various communication paths are possible. In the following, description will be given of each scenario with attention focused mainly on examples of V2V communication; however, similar communication operations are applicable to V2P and V2I. It is to be noted that in V2P and V2I, the communication destination is a Pedestrian or RSU.

Figure 7:
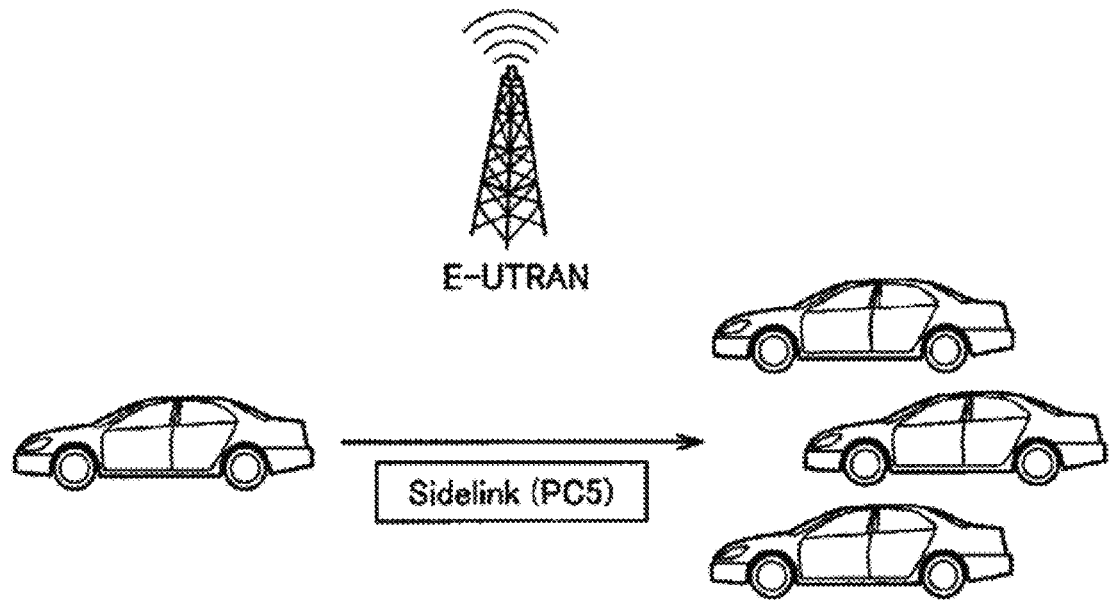
FIG. 7 is an explanatory diagram for describing an example of V2X operation scenarios.
Figure 8:
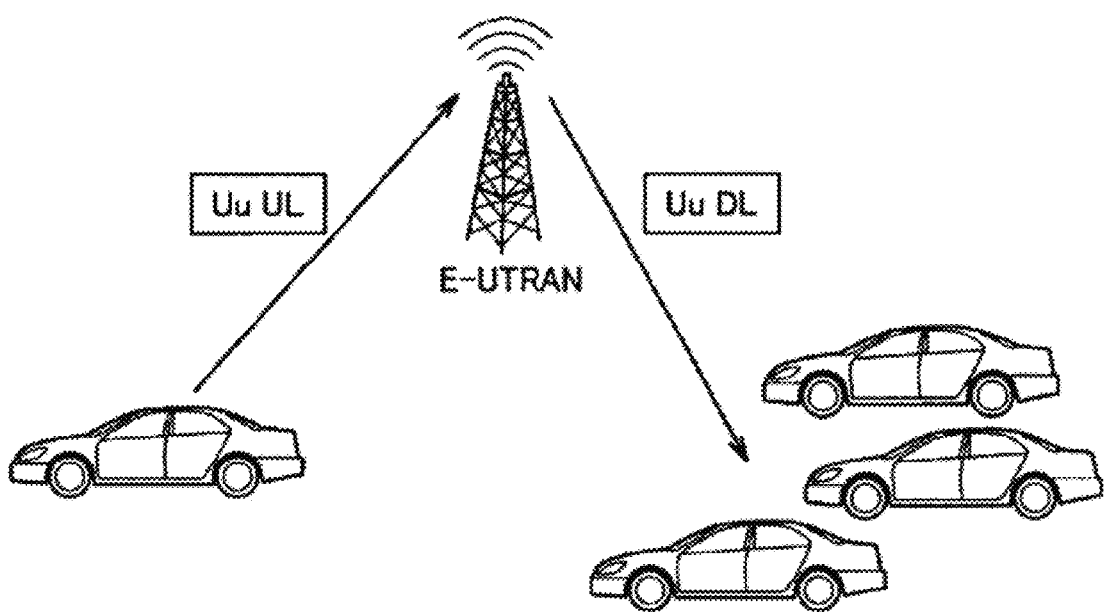
FIG. 8 is an explanatory diagram for describing an example of the V2X operation scenarios.
Figure 9:
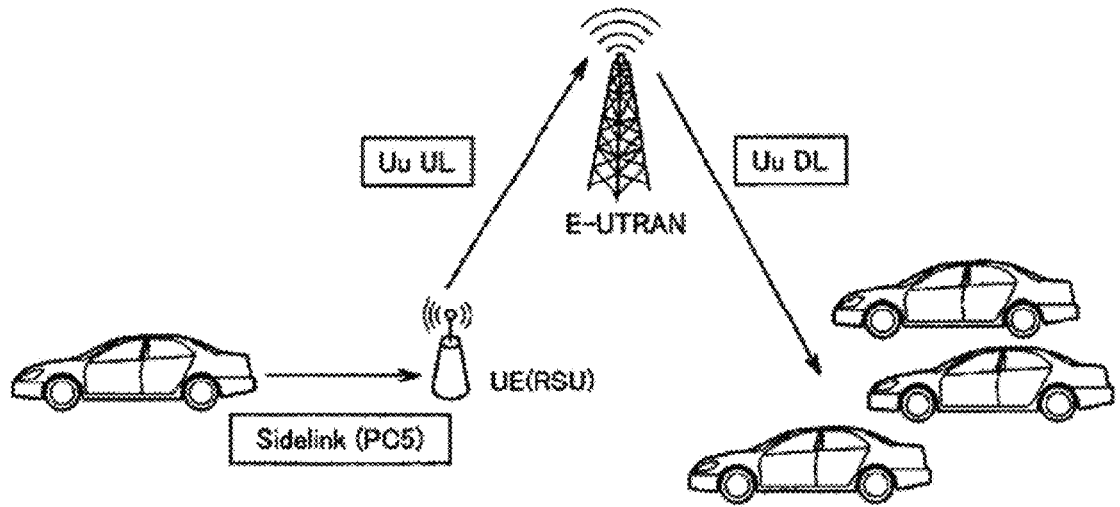
FIG. 9 is an explanatory diagram for describing an example of the V2X operation scenarios.
Figure 10:
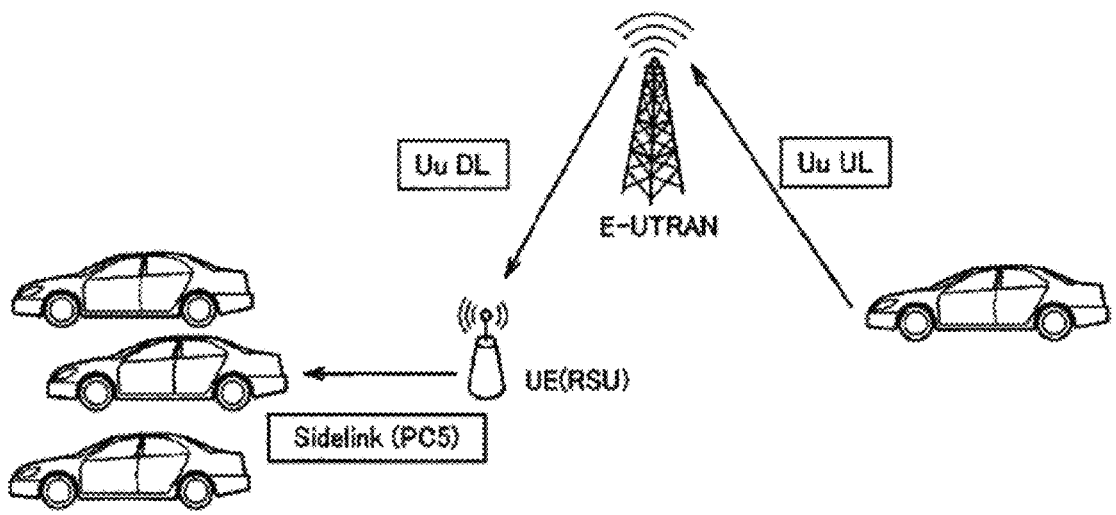
FIG. 10 is an explanatory diagram for describing an example of the V2X operation scenarios.
Figure 11:
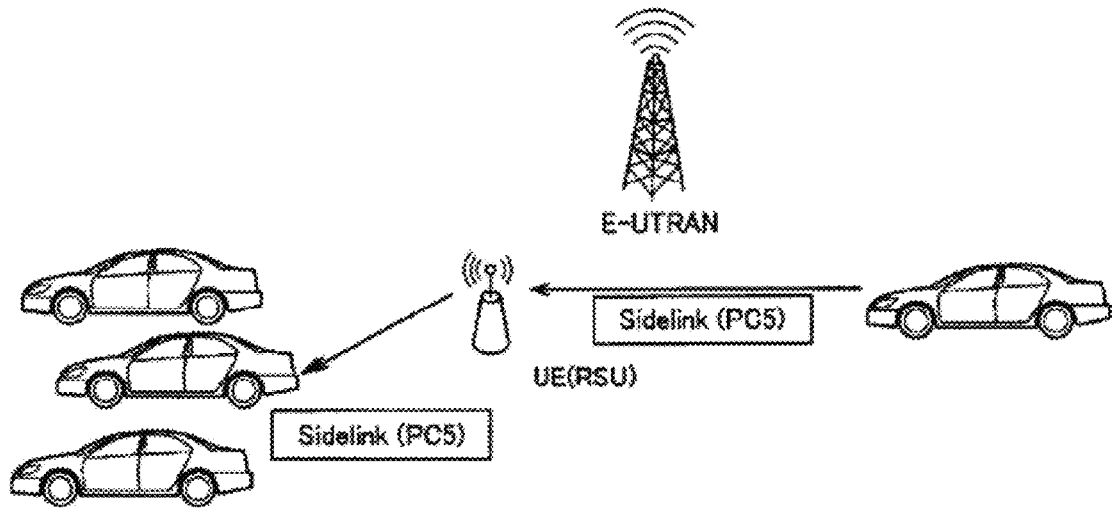
FIG. 11 is an explanatory diagram for describing an example of the V2X operation scenarios.
Figure 12:
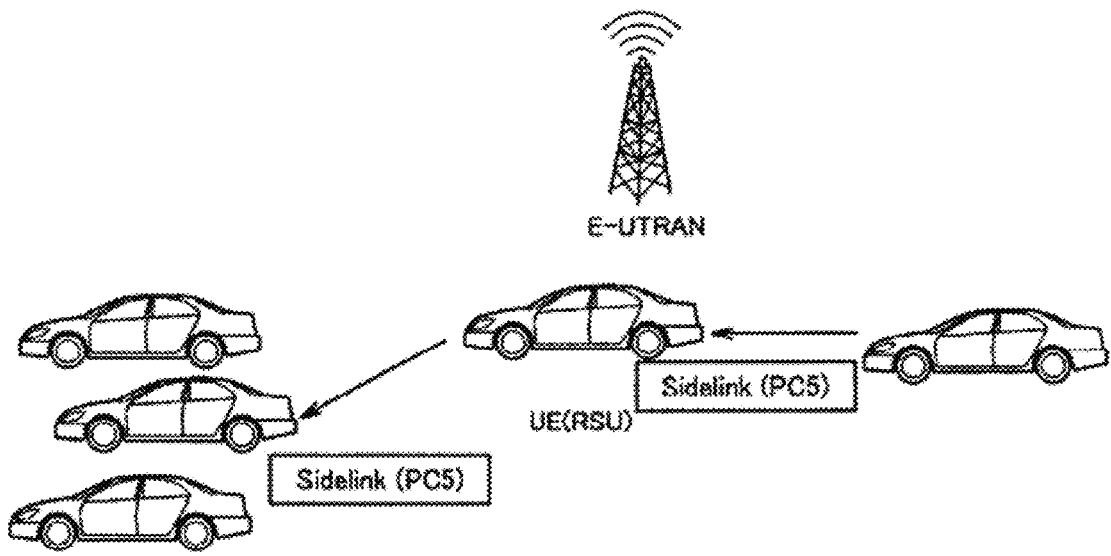
FIG. 12 is an explanatory diagram for describing an example of the V2X operation scenarios.

For example, FIGS. 7 to 12 are explanatory diagrams for describing examples of V2X operation scenarios. Specifically, FIG. 7 illustrates a scenario in which vehicles communicate directly with each other without intervention by a base station (E-UTRAN). FIG. 8 illustrates a scenario in which vehicles communicate with each other via the base station. FIGS. 9 and 10 illustrate a scenario in which vehicles communicate with each other via a terminal apparatus (UE, which is an RSU here) and the base station. FIGS. 11 and 12 illustrate a scenario in which vehicles communicate with each other via a terminal apparatus (UE, which is an RSU or another vehicle here).

It is to be noted that in FIGS. 7 to 12, the "Sidelink" corresponds to a communication link between terminal apparatuses, and is also referred to as PC5. Specific examples of the sidelink include communication links for V2V, V2P, and V2I. The "Uu interface" corresponds to a wireless interface between a terminal apparatus and a base station. A specific example of the Uu interface is a communication link for V2N. The "PC5 interface" corresponds to a wireless interface between terminal apparatuses.

3. Sidelink Resource Allocation Scheme

The present embodiment focuses on a resource allocation scheme for a V2V communication link in NR V2X communication. A sidelink control channel (PSCCH: Physical Sidelink Control Channel) and a data channel (PSSCH: Physical Sidelink Shared Channel) of LTE use a radio frame (radio frame) of LTE. There are cases where NR V2X supports different service types; for example, both a high-speed, high-capacity communication (eMBB) and a low-latency, high-reliability (URLLC) communication may be performed for a single vehicle. In particular, when performing the URLLC communication, the use of frame configuration of LTE may not make it possible to satisfy a demand for ultra-latency, and thus it is considered better to use numerology and frame configuration of NR. That is, in NR V2X, it is desirable to use the numerology and frame configuration of NR for a sidelink of NR in order to satisfy different service demands.

Meanwhile, if the numerology and frame configuration of NR are applied to the sidelink, decoding can fail with the sensing method of LTE V2X or the result of sensing can be affected in a case where the frame configuration is different from the LTE frame configuration. In a case where traffics of different frame configurations coexist, it is not possible to perform sensing simultaneously by an existing method. Further, when LTE and NR vehicles coexist, the vehicle performing communication by LTE is unable to read a transmission packet of the vehicle performing communication by NR because NR does not maintain backward compatibility. This affects the result of sensing of the vehicle performing communication by LTE.

Thus, in the present embodiment, description will be given of NR V2X sensing that is compatible with the numerology and frame configuration of NR.

First, an outline of a scheme to select a resource for a sidelink in the sensing result of LTE will be described.

Figure 13:
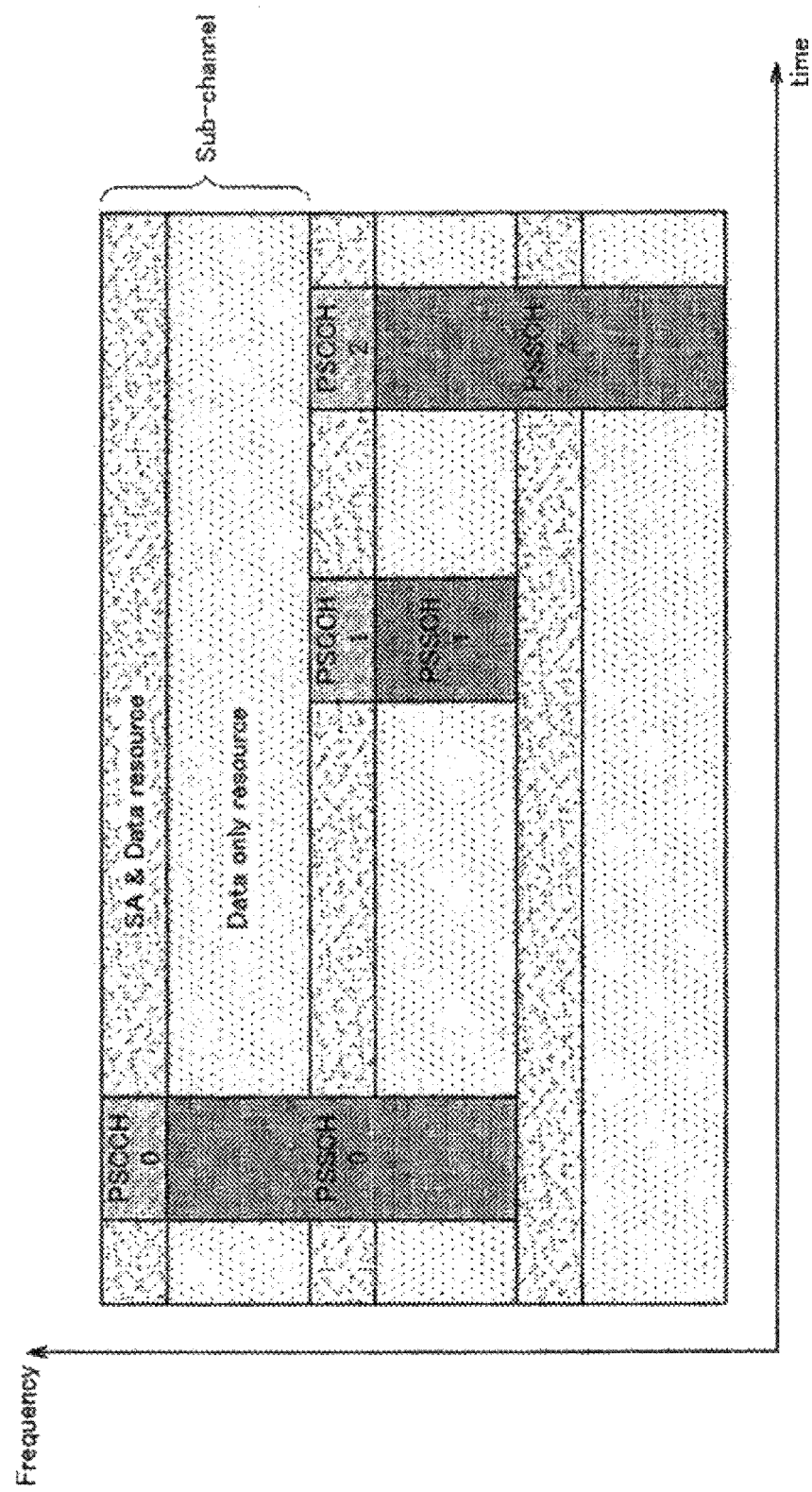
FIG. 13 is a diagram illustrating an example of a configuration of a resource assigned to a sidelink communication.

For example, FIG. 13 is a diagram illustrating an example of a configuration of resources (resource pool) allocated for sidelink communications, and illustrates an example of a case where frequency-division multiplexing (FDM: Frequency Division Multiplexing) is applied. As illustrated in FIG. 13, the resource pool is divided into an SA (Scheduling Assignment) region and a Data region, and the PSCCH (Physical Sidelink Control Channel) and PSSCH (Physical Sidelink Shared Channel) are transmitted by each region. It is to be noted that although the following description focuses on the case where FDM is applied as illustrated in FIG. 13, the application destination of the technology according to the present disclosure is not necessarily limited thereto. As a specific example, in a case where time-division multiplexing (TDM: Time Division Multiplexing) is applied, it is also possible to apply the technology according to the present disclosure described in the following. Note that in the case where TDM is applied, the SA region and Data region are orthogonal to each other on the time axis.

Schemes to allocate a resource to a sidelink include a "Mode 3 resource allocation" scheme in which a base station allocates a resource to a sidelink and a "Mode 4 resource allocation" scheme in which a terminal apparatus itself performs sensing and performs a resource selection for a sidelink. In the case where the terminal apparatus itself selects a resource, the terminal apparatus randomly selects a resource or senses previous use status of resources and thereafter selects a resource on the basis of the sensing result.

Mode 4 Resource Allocation

Figure 14:
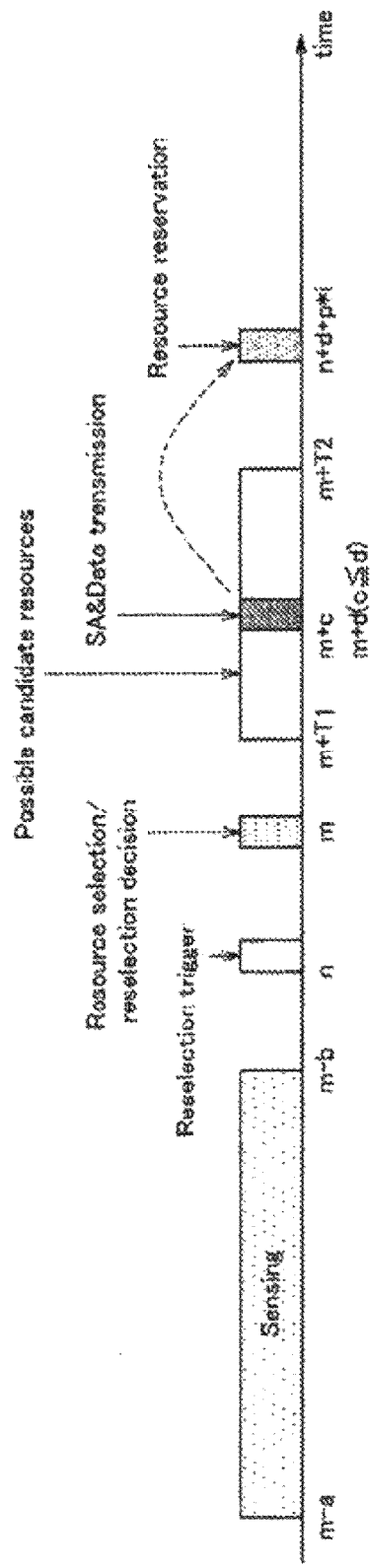
FIG. 14 is an explanatory diagram for describing an example of an operation timeline in a case where a terminal apparatus transmits a packet on the basis of Mode 4 resource allocation.

An outline of the Mode 4 resource allocation will be described with reference to FIG. 14. FIG. 14 is an explanatory diagram for describing an example of an operation timeline in a case where a terminal apparatus transmits a packet on the basis of the Mode 4 resource allocation. As illustrated in FIG. 14, the terminal apparatus that is to transmit the packet first performs sensing to discover a resource to be used for transmitting the packet from the resource pool. Next, the terminal apparatus selects the resource from the resource pool on the basis of the result of the sensing. Then, the terminal apparatus transmits the packet using the selected resource. Further, at this time, the terminal apparatus reserves a resource to be used for a subsequent packet transmission as necessary.

As sensing, LTE V2X supports two sensing methods, i.e., SA decoding and Energy measurement. The terminal apparatus simultaneously performs these sensing operations to perform a resource selection.

SA decoding is a sensing method in which a control channel transmitted from a terminal apparatus is decoded. Some of the SA information makes it possible to determine whether or not a future resource has been reserved. However, unsuccessful decoding of the SA signal has a disadvantage that the resource occupation status in the data region becomes unknown. Further, even in a case where occupation is found by the SA signal, if the terminal apparatus on the transmission side is sufficiently away from the position of the terminal apparatus on the receiving side, a power level in the data region may actually be at or below an acceptable level. Because SA decoding alone is unable to measure such a power level of the data region, there is a concern that an actually usable resource can be excluded as being unable to serve for transmission.

In order to resolve the above problem, for LTE V2X, it has been agreed that Energy measurement and SA decoding shall be used in combination. Energy measurement allows for measurement of an actual use status of resources in terms of power level, and is therefore able to complement SA decoding.

Figure 15:
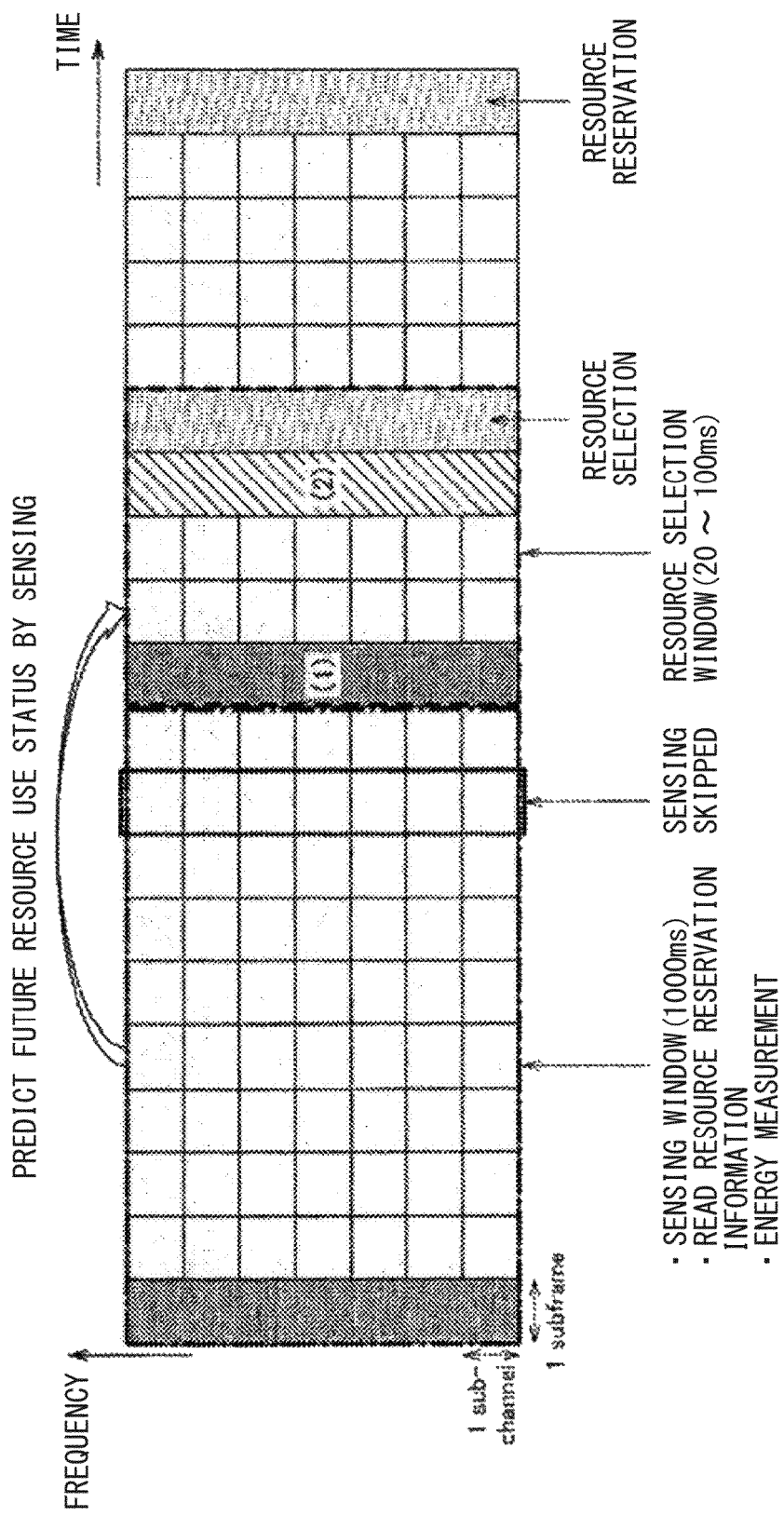
FIG. 15 is an explanatory diagram illustrating a sensing operation in LTE V2X.

FIG. 15 is an explanatory diagram illustrating a sensing operation in LTE V2X. FIG. 15 illustrates an example of the sensing operation for selecting a resource from the resource pool.

More specifically, on the basis of a power measurement result in a sensing window and a reservation status of resources in the sensing window, a terminal apparatus performs selection of a resource in a resource selection window and a future resource reservation. As a specific example, in the example illustrated in FIG. 15, in a case of the occurrence of a packet to be transmitted, the terminal apparatus predicts a use status of a resource in the future, such as a resource to be used for transmission of another packet in the future, on the basis of the result of the sensing. By using the result of the prediction, the terminal apparatus is able to select or reserve a resource that is usable for transmission of the packet, that is, a resource that is expected not to be used for transmission of other packets.

4. Control of Sidelink V2V Communication Between Sender and Receiver

As compared with LTE, requirements for NR are stricter. In LTE, the minimum reservation period is 20 milliseconds, whereas NR supports use cases with a stricter latency requirement (3 milliseconds). Thus, there is a possibility that the latency requirement may not be satisfiable with the method performed in LTE. In addition, reliability of about 90% is required of LTE, whereas reliability of approximately 100% is required of NR, and therefore there is a possibility that the reliability requirement may not be satisfiable with the method performed in LTE.

Further, in Mode 3, although collision-free resource allocation is possible, the overhead of scheduling requests and responses is large for resource scheduling. In Mode 4, the overhead is small because the terminal apparatus itself selects a resource; however, performance of sidelink communication is degraded because resource collisions are likely to occur.

Hence, the discloser of the present case has intensively studied a technique enabling sidelink communication in which stricter latency requirement and reliability requirement are satisfiable. As a result, as described in the following, the discloser of the present case has devised a technique that allows a sidelink communication between a sender and a receiver to be controlled by a third party other than the sender and the receiver through a sidelink, thereby enabling sidelink communication in which stricter latency requirement and reliability requirement are satisfiable.

In the following, a terminal apparatus that corresponds to the above-described third party and controls a terminal apparatus performing a sidelink communication is referred to as a "Master UE," and the terminal apparatus to undergo the Master UE's control over the sidelink communication is referred to as a "Slave UE".

In order to be the Master UE, it shall be necessary to have at least one of the following capabilities: being able to perform resource scheduling of sidelink communication; and being able to assist another terminal apparatus with resource allocation in sidelink communication of the other terminal apparatus. Being able to assist another terminal apparatus with resource allocation in sidelink communication of the other terminal apparatus specifically includes supplying information related to resource selection (for example, the result of sensing), applying limitation information to transmission parameters to thereby control the sidelink communication, and the like. Applying limitation information to the transmission parameters refers to, for example, limiting resources selectable for the sidelink communication of the other terminal apparatus or MCS (Modulation and Coding Scheme).

A terminal apparatus that is able to be the Master UE may be, for example, a terminal apparatus that is a UE-type RSU (Road Side Unit) or may be a terminal apparatus selected from among two or more terminal apparatuses. The two or more terminal apparatuses may randomly select the Master UE or may become the Master UE in a predetermined order.

Figure 16:
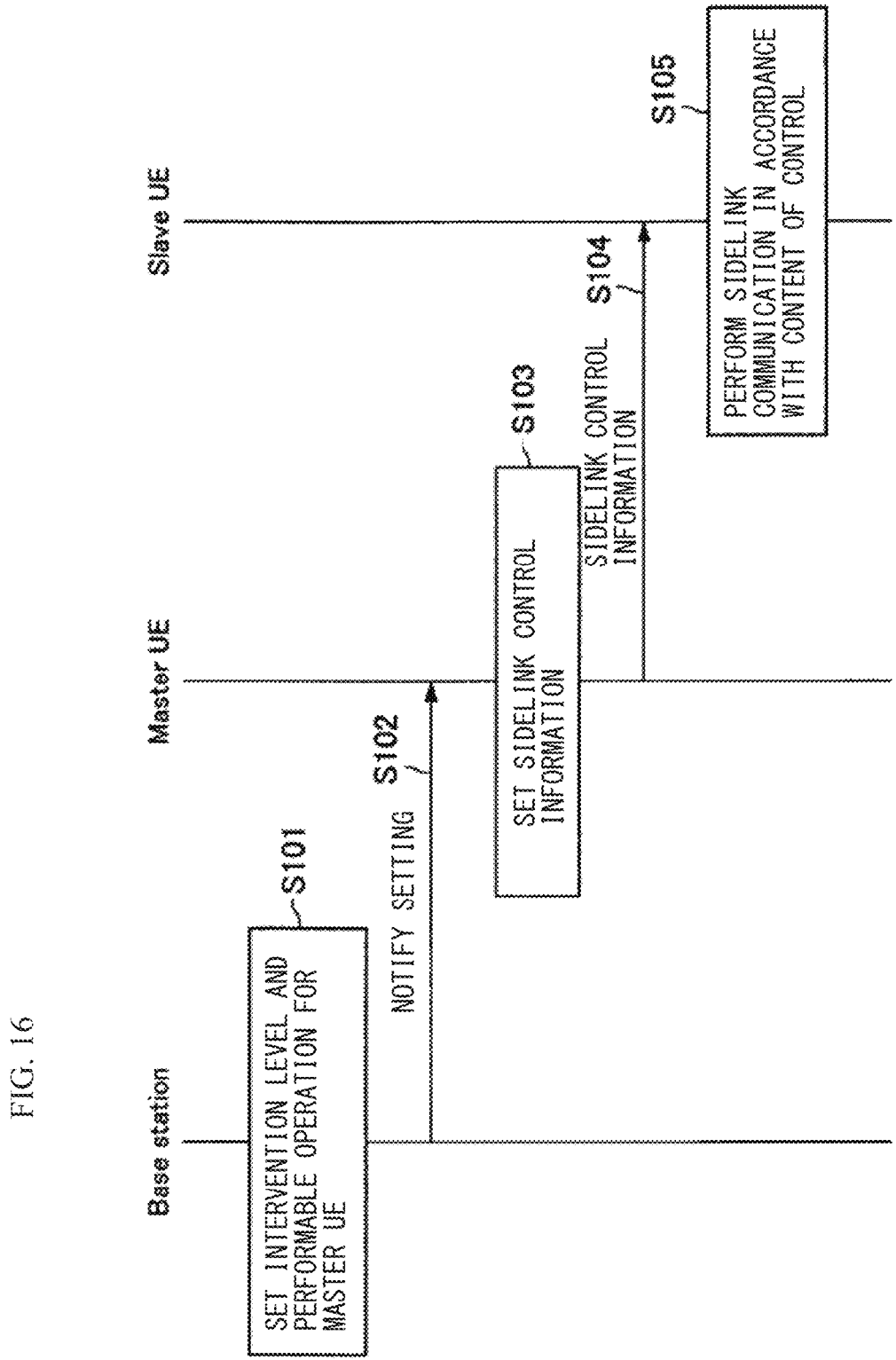
FIG. 16 is a flowchart illustrating an outline of control of sidelink V2V communication between a sender and a receiver according to the embodiment of the disclosure.

FIG. 16 is a flowchart illustrating an outline of control of sidelink V2V communication between a sender and a receiver according to the embodiment of the present disclosure. FIG. 16 illustrates operations of the base station 100 (Base Station), the Master UE, and the Slave UE.

The base station 100 sets a level at which the Master UE is able to intervene in the sidelink communication and performable operations (step S101). In the currently available LTE V2X, the base station designates either Mode 3 (scheduled-14) or Mode 4 (ue-selected-r14) as the resource allocation method for the terminal apparatuses. In the present embodiment, a mode called a sidelink control by Master UE is introduced, and therefore this mode of sidelink control by Master UE (for example, master-controlled-r14) is designated.

Upon setting the intervention level and performable operations at step S101, the base station 100 notifies the Master UE of the contents of the setting (step S102). Upon receiving the notification from the base station 100, the Master UE sets sidelink control information in accordance with the notification (step S103). The sidelink control information is information for controlling sidelink communication by the Slave UE, and specific examples thereof will be described later.

The Master UE notifies the Slave UE of the sidelink control information (step S104). Then, the Slave UE performs sidelink communication according to the sidelink control information set by the Master UE (step S105). This makes it possible for the Slave UE to perform sidelink communication that is able to satisfy a strict latency requirement and reliability requirement.

In the present embodiment, the Master UE shall be classifiable according to different intervention levels in the control of sidelink. The intervention levels are an example of operation levels of the present disclosure. For example, level 1 may be an intervention level of information collection and information sharing, level 2 may be an intervention level of terminal limitation, and level 3 may be an intervention level of terminal control. Needless to say, the number of the levels and the operations corresponding to those levels are not limited to such an example. In the following, an example of a procedure for each level will be described.

(Level 1—Information Collection and Information Sharing)

Figure 17:
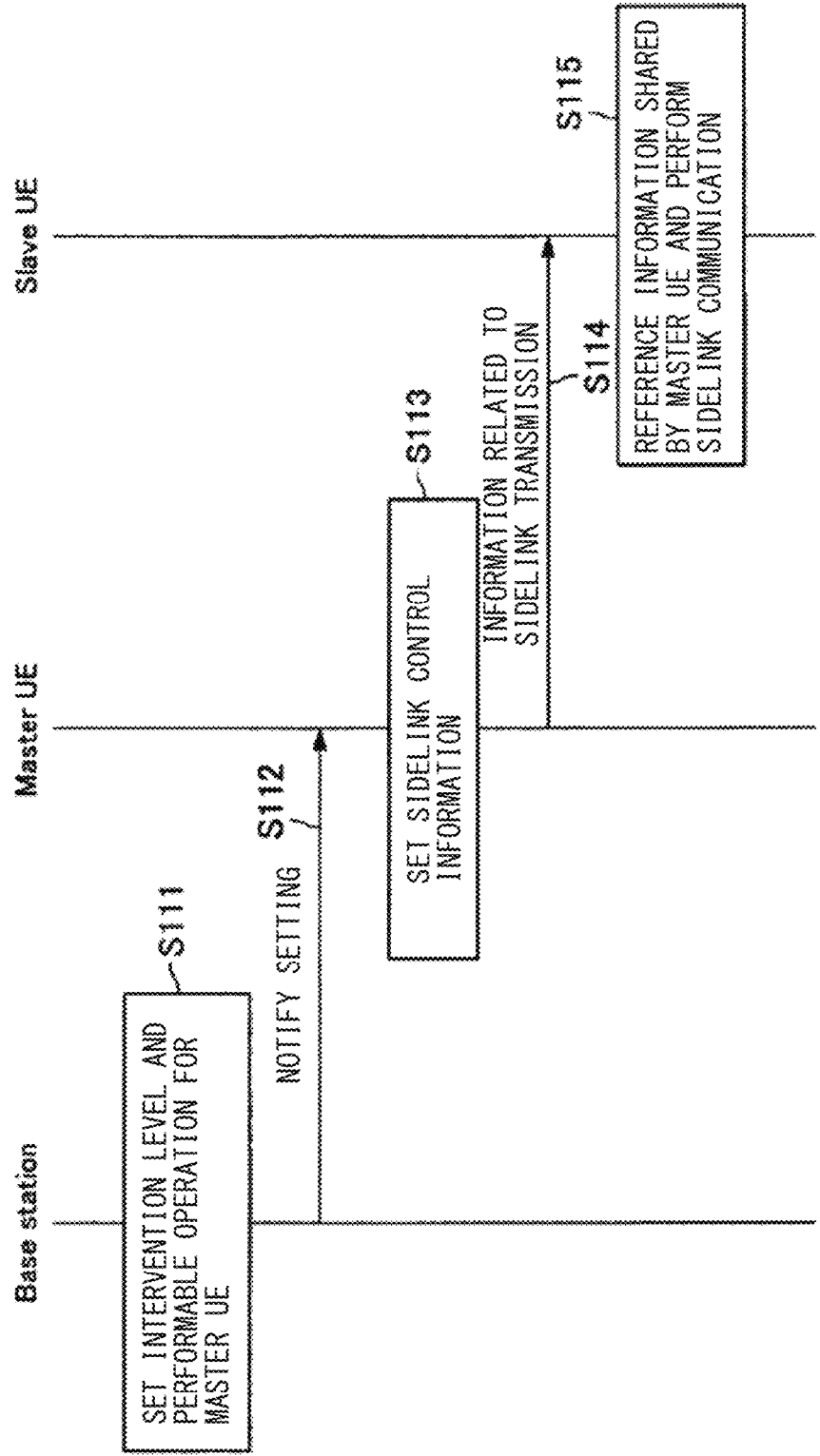
FIG. 17 is a flowchart illustrating an outline of control of sidelink V2V communication between a sender and a receiver according to the embodiment of the disclosure.

The Master UE of level 1 collects information necessary for sidelink communication and shares the information with the Slave UE. The Slave UE determines how to use the shared information. FIG. 17 is a flowchart illustrating an outline of control of sidelink V2V communication between a sender and a receiver according to the embodiment of the present disclosure. FIG. 17 illustrates the operations of the base station 100 (Base Station), the Master UE of level 1, and the Slave UE.

The base station 100 sets a level at which the Master UE is able to intervene in the sidelink communication and performable operations (step S111). Here, the base station 100 sets level 1 as the intervention level for the Master UE. Upon setting the intervention level and performable operations at step S111, the base station 100 notifies the Master UE of the contents of the setting (step S112). Upon receiving the notification from the base station 100, the Master UE sets sidelink control information in accordance with the notification (step S113).

For example, the Master UE collects and shares with the Slave UE information, etc. including CBR (Channel Busy Ratio) during a certain period of time (T1 to T2), channel resource occupancy ratio (Channel Occupancy Ratio) for each terminal apparatus, use status of resources (for example, RSSI (Received Signal Strength Indicator) for each subchannel) during a certain period of time, traffic models of other terminal apparatuses, priority information of transmission packets of the other terminal apparatuses, service types of the transmission packets of the other terminal apparatuses, and the positions, speeds, moving directions, etc. of the other terminal apparatuses.

The Master UE may collect these pieces of information by sensing by itself, or may collect these pieces of information by being notified from the base station 100. Further, the Master UE may collect these pieces of information by being notified from another Master UE. Further, the Master UE may collect these pieces of information by being notified from another communication apparatus (not limited to a Slave UE). In the case of being notified by another communication apparatus, reports may be received from the other communication apparatus on a regular basis. Further, in the case of being notified by another communication apparatus, a request may be sent to the other communication apparatus to have the other communication apparatus make a report in response to the request. In the case of having the other communication apparatus make a report, the base station or the Master UE may schedule or set the timing of reporting and a transmission resource for reporting in the other communication apparatus. In the case of having the other communication apparatus make a report, the timing of reporting may be instructed explicitly or implicitly. For example, the base station or the Master UE may set the other communication apparatus to cause the report to be made after X subframes (X is an integer greater than or equal to 1) after receipt of the request.

The Master UE notifies the Slave UE of information related to sidelink transmission (step S114). Then, the Slave UE references the information shared by the Master UE and performs sidelink communication (step S115).

The Master UE may share the collected information with the Slave UE through an RRC (Radio Resource Control) of the sidelink. Further, the Master UE may share the collected information with the Slave UE through a Physical sidelink channel (for example, PSCCH or PSSCH).

(Level 2—Terminal Limitation)

The Master UE of level 2 limits parameters related to transmission by a terminal apparatus to perform sidelink communication. In other words, the Master UE of level 2 is able to impose a certain limitation on the parameters necessary for sidelink communication of the Slave UE. For example, the Master UE of level 2 is able to set candidates for certain parameters. The Slave UE is able to select a resource for transmission from among the candidates for the parameters set by the Master UE. In addition, the Master UE of level 2 is able to limit a region in which the Slave UE is to perform sensing. The Slave UE senses the utilization status of only the resources within the sensing region limited by the Master UE. This makes it possible for the Slave UE to perform sidelink communication that is able to satisfy the strict latency requirement and reliability requirement.

Figure 18:
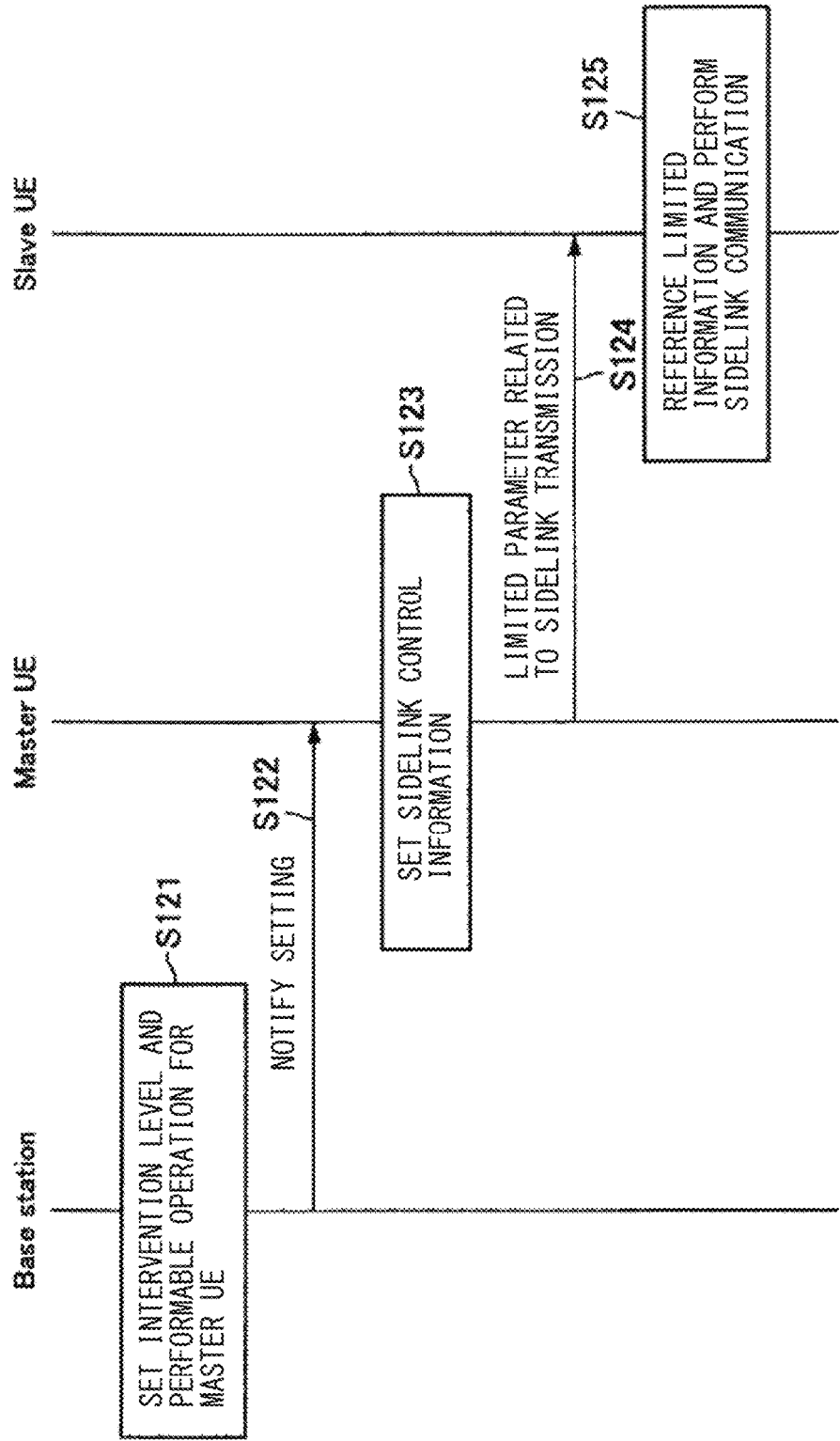
FIG. 18 is a flowchart illustrating an outline of control of sidelink V2V communication between a sender and a receiver according to the embodiment of the disclosure.

FIG. 18 is a flow chart illustrating an outline of control of sidelink V2V communication between a sender and a receiver according to the embodiment of the present disclosure. FIG. 18 illustrates operations of the base station 100 (Base Station), the Master UE of level 2, and the Slave UE.

The base station 100 sets a level at which the Master UE is able to intervene in the sidelink communication and performable operations (step S121). Here, the base station 100 sets level 2 as the intervention level for the Master UE. Upon setting the intervention level and performable operations at step S121, the base station 100 notifies the Master UE of the contents of the setting (step S122). Upon receiving the notification from the base station 100, the Master UE sets sidelink control information in accordance with the notification (step S123).

The Master UE notifies the Slave UE of limited parameters related to sidelink transmission (step S124). Then, the Slave UE references the information limited by the Master UE and performs sidelink communication (step S125).

Examples of parameters limitable by the Master UE of level 2 include parameters related to a sensing window, candidate resource sets available for transmission, a maximum value of transmission power, selectable MCSs, a settable resource reservation period, a settable resource selection counter, a resource pool available for transmission of a HARQ Feedback, a resource pool available for transmission of measurement results when reporting, parameters related to MIMO, the number of times of retransmissions (e.g., a maximum value of the number of retransmissions) of component carriers capable of carrier aggregation, and the number of times of repetition (Repetition) transmissions (e.g., a maximum value of the number of times of Repetitions). The Master UE of level 2 may limit, as the parameters related to the sensing window, any of a time domain of sensing, a frequency domain of sensing, and a time and frequency domain of sensing. The Master UE of level 2 may limit, as a candidate resource set available for transmission, any of a time resource set, a frequency resource set, and a time and frequency resource set available for sidelink communication. The Master UE of level 2 may limit, as the parameters related to MIMO, any of a beam pattern (for example, a beam angle, width, and a beam sweeping range) and a pattern of an antenna port that the Slave UE uses.

When limiting the above-described parameters, the Master UE of level 2 may limit selectable candidates for the parameters or may impose the limitation by setting limiting values of the parameters. In the case of limiting the selectable candidates for the parameters, the Master UE of level 2 may limit a selectable range of the parameters or limit the selectable candidates for the parameters in the form of bitmaps.

The base station 100 may notify the Master UE of the parameters to be limited or may configure (preconfigure) the parameters to be limited in the Master UE. Then, at the above-described step S124, the Master UE notifies the Slave UE of the parameters to be limited through the sidelink.

(Level 3—Terminal Control)

The Master UE of level 3 controls, with reliability, the parameters necessary for sidelink communication of the Slave UE. For example, the Master UE of level 3 schedules a time and frequency resource for sidelink communication.

Figure 19:
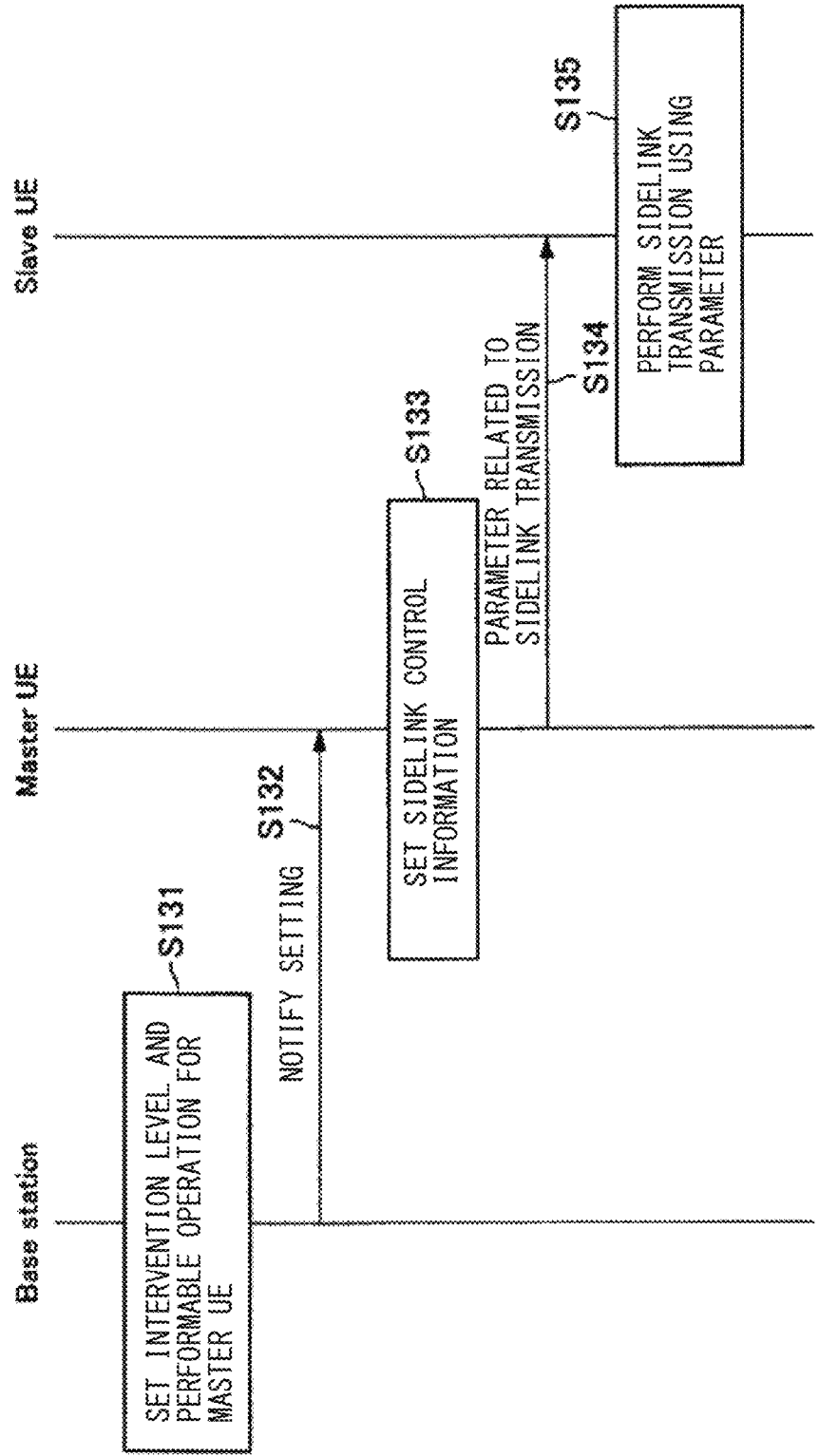
FIG. 19 is a flowchart illustrating an outline of control of sidelink V2V communication between a sender and a receiver according to the embodiment of the disclosure.

FIG. 19 is a flowchart illustrating an outline of control of sidelink V2V communication between a sender and a receiver according to the embodiment of the present disclosure. FIG. 19 illustrates operations of the base station 100 (Base Station), the Master UE of level 3, and the Slave UE.

The base station 100 sets a level at which the Master UE is able to intervene in the sidelink communication and performable operations (step S131). Here, the base station 100 sets level 3 as the intervention level for the Master UE. Upon setting the intervention level and performable operations at step S131, the base station 100 notifies the Master UE of the contents of the setting (step S132). Upon receiving the notification from the base station 100, the Master UE sets sidelink control information in accordance with the notification (step S133).

The Master UE of level 3 may control, as controllable parameters, at least either a time resource or a frequency resource for sidelink transmission, a transmission power, an MCS for transmission, an upper limit of channel resource (CR limit), a resource reservation period, a resource selection counter, at least either a time resource or a frequency resource for HARQ Feedback transmission, at least either a time resource or a frequency resource for transmission to be used in reporting measurement results, parameters related to MIMO, parameters related to carrier aggregation, the number of times of repetition transmissions, and the like.

The Master UE notifies the Slave UE of the limited parameters related to sidelink transmission (step S134). Then, the Slave UE references the information limited by the Master UE and performs sidelink communication (step S135).

The base station 100 may notify the Master UE of the parameters to be controlled, or may configure (preconfigure) the parameters to be controlled in the Master UE. Then, at the above-described step S134, the Master UE notifies the Slave UE of the parameters to be limited through the sidelink.

Each intervention level has been described above. In the control of sidelink by the Master UE, it is necessary that at least the intervention level and operations performable at the intervention level be set. Thus, the following will describe a method of setting the intervention level and operations performable at the intervention level.

Here, a case where the Master UE is within a coverage of the base station 100 (In coverage) and a case where the Master UE is outside the coverage (out-of-coverage) will be described separately.

In the case where the Master UE is within the coverage of the base station 100, the base station 100 may instruct the Master UE of the intervention level and mapping information of operations performable at that intervention level. Further, in the case where the Master UE is within the coverage of the base station 100, the base station 100 may notify the Mater UE of the intervention level, and the mapping information of the operations performable at the intervention level may be preconfigured in the Master UE.

Meanwhile, in the case where the Master UE is outside the coverage of the base station 100, the base station 100 may preconfigure the intervention level and the mapping information of the operations performable at the intervention level in the Master UE. The Master UE may set the intervention level and the operations performable at the intervention level on the basis of the preconfigured information.

The mapping information described above may be roughly mapped one. For example, the mapping information may be like one indicating that Level 1 corresponds to information collection and sharing, Level 2 corresponds to terminal limitation, and Level 3 corresponds to terminal control. In this case, the Master UE specifically determines by itself what information is to be collected and shared and what parameters are to be limited or controlled. Further, the mapping information described above may be one that is set in detail. For example, the mapping information may be like one indicating that Level 1 corresponds to collecting and sharing information about the result of sensing.

The timing of setting may be when the Master UE couples to the base station, when the Master UE receives a request for level setting from the base station, or when the Master UE has come into an RRC-CONNECTED state.

The base station 100 may notify the Master UE of the intervention level and operations performable at that intervention level using, for example, a PBCH (Physical Broadcast Channel), an SIB (System Information Block), RRC (Radio Resource Control) signaling, a PDCCH (Physical Downlink Control Channel), a PDSCH (Physical Downlink Shared Channel), or the like.

When setting an intervention level and operations performable at the intervention level on the Master UE, the base station 100 may perform the setting in consideration of, for example, CBR information, position information about the Master UE, capability of the Master UE, traffic model of the Master UE, and the like. As an example, a case of considering position information about the Master UE will be described. For example, a density of the Slave UEs is considered to vary depending on the position status of the Master UE. It is desirable that the intervention level of the Master UE become higher with increasing number of the Slave UEs to be managed. If the Master UE is at a low intervention level (for example, if information collection and sharing is only allowed), the Slave UE is to select a resource by itself, and as a result, a resource collision is likely to occur. Therefore, if the Master UE is located to have a large number of Slave UEs to be managed, the base station 100 may set the intervention level at a high level.

Figure 20:
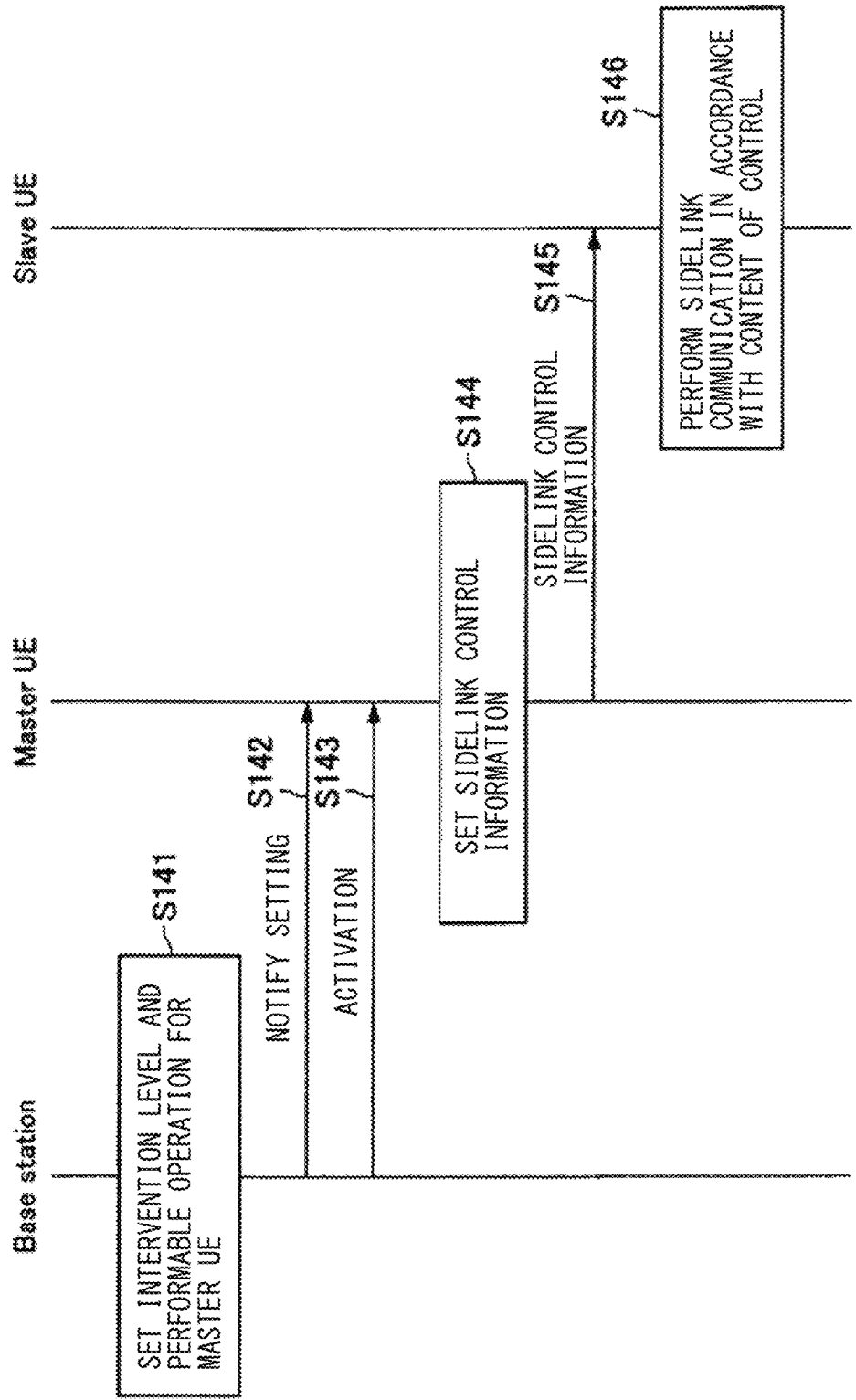
FIG. 20 is a flowchart illustrating an outline of control of sidelink V2V communication between a sender and a receiver according to the embodiment of the disclosure.

FIG. 20 is a flowchart illustrating an outline of control of sidelink V2V communication between a sender and a receiver according to the embodiment of the present disclosure. FIG. 20 illustrates operations of the base station 100 (Base Station), the Master UE, and the Slave UE.

The base station 100 sets a level at which the Master UE is able to intervene in the sidelink communication and performable operations (step S141). Upon setting the intervention level and performable operations at step S141, the base station 100 notifies the Master UE of the contents of the setting (step S142). Further, when setting the intervention level and performable operations, the base station 100 transmits an activation request to the Master UE (step S143). Upon receiving the activation request from the base station 100, the Master UE sets sidelink control information in accordance with the notification (step S144).

Subsequently, the Master UE notifies the Slave UE of the sidelink control information (step S145). Then, the Slave UE performs sidelink communication in accordance with the sidelink control information set by the Master UE (step S146).

The Slave UE performs V2X communication on the basis of the information transmitted from the Master UE. Here, a description will be given of how the Slave UE discovers the Master UE.

The Slave UE controlled by the Master UE via the sidelink performs discovery of the Master UE. At this time, the Slave UE may search for the Master UE by broadcasting a discovery request to the surroundings. Further, the Master UE may broadcast a discovery announcement to the surroundings to search for the Slave UE.

The Slave UE performs a measurement in a case where a measurement instruction is received from the base station 100 or the Master UE. Thereafter, the Slave UE reports the results of the measurement to the Master UE at an instructed measurement report timing. Alternatively, in a case where the Slave UE receives measurement and report instructions from the base station 100 or the Master UE on a regular basis, the Slave UE may perform the measurement at set intervals and report the measurement to the Master UE.

In a case where the Master UE shares information with the Slave UE, the Slave UE references the information shared by the Master UE and performs the sidelink communication. For example, in a case where the Master UE shares the sensing result, the Slave UE is able to select a transmission resource by using the sensing result of its own and the sensing result of the Master UE.

In a case where the Master UE limits parameters related to the sidelink communication of the Slave UE, the Slave UE performs sidelink transmission in accordance with the limitation by the Master UE. For example, in a case where the sensing area is limited by the Master UE, the Slave UE performs sensing only in the limited area. Further, for example, in a case where the CR (channel resource) is limited by the Master UE, the Slave UE selects a resource for the sidelink communication so as not to exceed the upper limit (CR limit) of the channel resource.

In a case where the Master UE controls parameters related to the sidelink communication of the Slave UE, the Slave UE performs sidelink transmission by using the resource scheduled by the Master UE and the set parameters related to the sidelink transmission.

In this way, in the present embodiment, the Slave UE undergoes sidelink communication management by the Master UE. This enables the Slave UE according to the present embodiment to perform sidelink communication in which strict latency requirement and reliability requirement are satisfiable.

5. Application Examples 5.1. Application Example Related to Base Station

First Application Example

Figure 21:
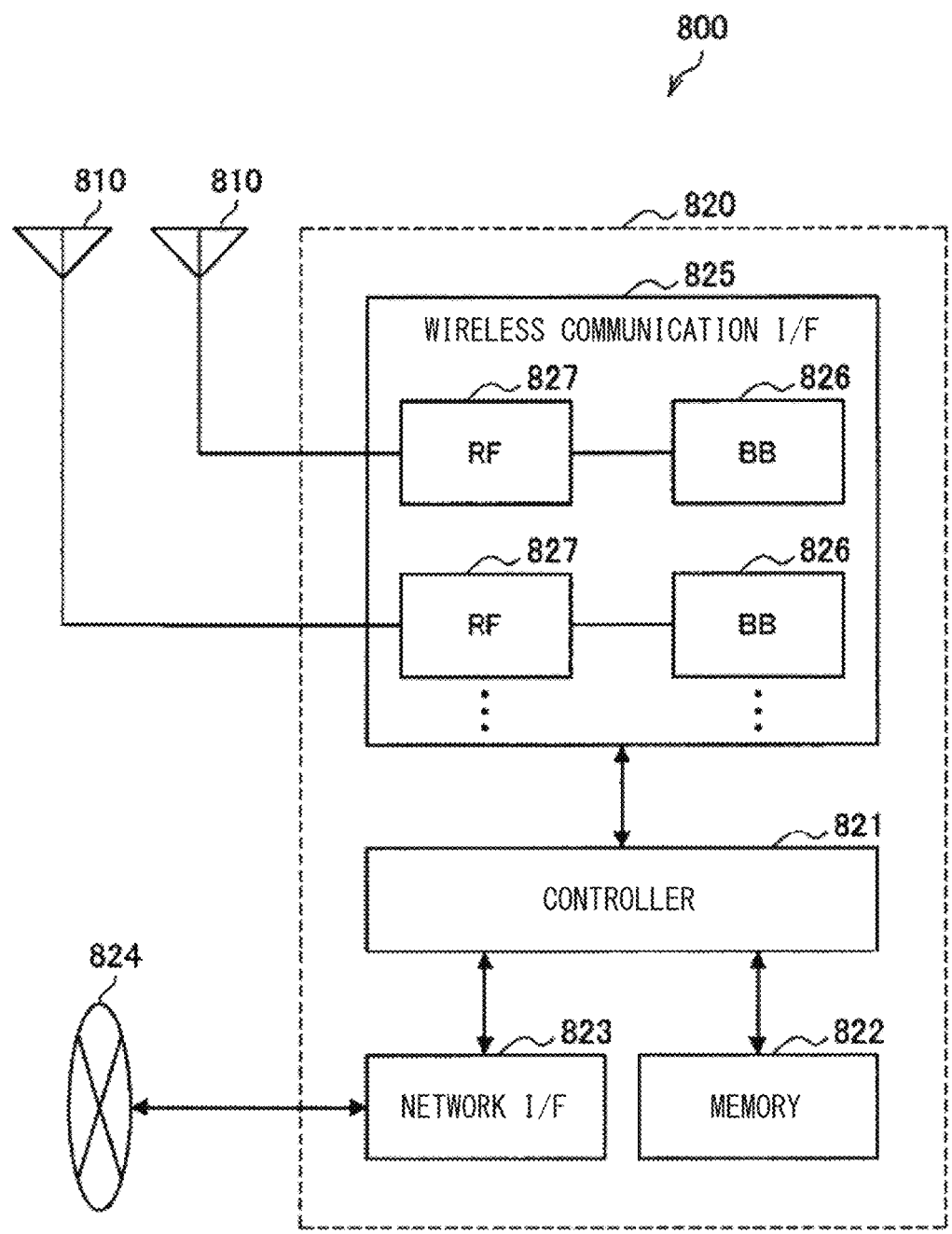
FIG. 21 is a block diagram illustrating a first example of a schematic configuration of an eNB.

FIG. 21 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be coupled to each other via an RF cable.

Each of the antennas 810 includes a single or two or more antenna elements (for example, two or more antenna elements that configure an MIMO antenna), and is used for the base station apparatus 820 to transmit and receive radio signals. The eNB 800 may include two or more antennas 810 as illustrated in FIG. 21, and the two or more antennas 810 may respectively correspond to two or more frequency bands to be used by the eNB 800, for example. It is to be noted that although FIG. 21 illustrates an example in which the eNB 800 includes the two or more antennas 810, the eNB 800 may include a single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from two or more base band processors to generate a bundled packet, and transfer the generated bundled packet. Further, the controller 821 may have logical functions of performing control including radio resource control (Radio Resource Control), radio bearer control (Radio Bearer Control), mobility management (Mobility Management), admission control (Admission Control), scheduling (Scheduling), and the like. Further, the control may be performed in corporation with an eNB or a core network node in the vicinity. The memory 822 includes RAM and ROM, and stores a program to be executed by the controller 821, and various control data (for example, a terminal list, transmission power data, scheduling data, and the like).

The network interface 823 is a communication interface for coupling the base station apparatus 820 to a core network 824. The controller 821 may communicate with a core network node or another eNB via the network interface 823. In that case, the eNB 800 and the core network node or the other eNB may be coupled to each other through a logical interface (for example, an S1 interface or X2 interface). The network interface 823 may be a wired communication interface or a wireless communication interface for wireless backhaul. In the case where the network interface 823 is a wireless communication interface, the network interface 823 may use, for wireless communication, a frequency band higher than a frequency band to be used by the wireless communication interface 825.

The wireless communication interface 825 supports any cellular communication scheme such as LTE (Long Term Evolution), LTE-Advanced, or the like, and provides wireless coupling to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, multiplexing/demultiplexing and the like, and performs various signal processing of each layer (for example, L1, MAC (Medium Access Control, RLC (Radio Link Control), and PDCP (Packet Data Convergence Protocol). The BB processor 826 may have a part or all of the above-described logical functions instead of the controller 821. The BB processor 826 may be a module including a memory that stores a communication control program, a processor that performs the program, and a related circuit. The functions of the BB processor 826 may be changeable by updating the program. The above-described module may be a card or a blade to be inserted into a slot of the base station apparatus 820, or may be a chip to be mounted on the above-described card or the above-described blade. Meanwhile, the RF circuit 827 may include a mixer, a filter, an amplifier, and the like, and transmits and receives radio signals via the antenna 810.

The wireless communication interface 825 may include two or more BB processors 826 as illustrated in FIG. 21, and the two or more BB processors 826 may respectively correspond to the two or more frequency bands to be used by the eNB 800, for example. Further, the wireless communication interface 825 may include two or more RF circuits 827 as illustrated in FIG. 21, and the two or more RF circuits 827 may respectively correspond to the two or more antenna elements, for example. Although FIG. 21 illustrates an example in which the wireless communication interface 825 includes the two or more BB processors 826 and the two or more RF circuits 827, the wireless communication interface 825 may include a single BB processor 826 or a single RF circuit 827.

In the eNB 800 illustrated in FIG. 21, one or more components included in the base station 100 described with reference to FIG. 2 (for example, at least one of the communication control section 151, the information acquisition section 153, or the notification section 155) may be implemented in the wireless communication interface 825. Alternatively, at least some of these components may be implemented in the controller 821. As an example, the eNB 800 may be equipped with a module including a part (for example, the BB processor 826) or all of the wireless communication interface 825 and/or the controller 821, and the above-described one or more components may be implemented in the module. In this case, the above-described module may store a program for causing the processor to function as the above-described one or more components (in other words, a program for causing the processor to execute operations of the above-described one or more components), and may execute the program. As another example, a program for causing the processor to function as the above-described one or more components may be installed in the eNB 800, and the wireless communication interface 825 (for example, the BB processor 826) and/or the controller 821 may execute the program. As described above, the eNB 800, the base station apparatus 820, or the above-described module may be provided as an apparatus including the above-described one or more components, and the program for causing the processor to function as the above-described one or more components may be provided. In addition, a readable recording medium in which the above-described program is recorded may be provided.

In addition, in the eNB 800 illustrated in FIG. 21, the wireless communication unit 120 described with reference to FIG. 2 may be implemented in the wireless communication interface 825 (for example, the RF circuit 827). Further, the antenna unit 110 may be implemented in the antenna 810. Further, the network communication unit 130 may be implemented in the controller 821 and/or the network interface 823. Further, the storage unit 140 may be implemented in the memory 822.

Second Application Example

Figure 22:
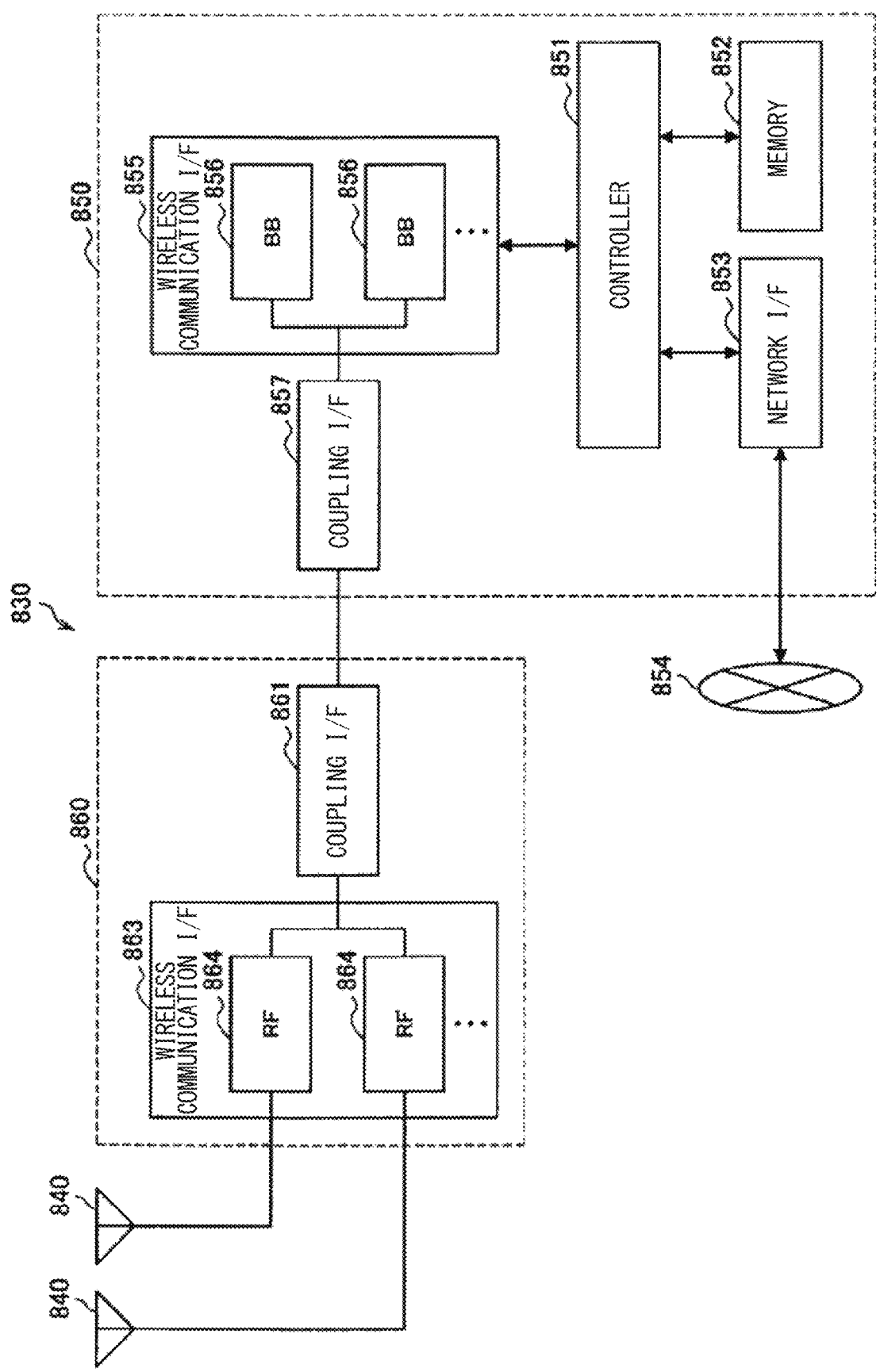
FIG. 22 is a block diagram illustrating a second example of a schematic configuration of an eNB.

FIG. 22 is a block diagram illustrating a second example of a schematic configuration of an eNB to which the technology according to the present disclosure may be applied. An eNB 830 includes one or more antennas 840, a base station apparatus 850, and an RRH 860. Each antenna 840 and the RRH 860 may be coupled to each other via an RF cable. Further, the base station apparatus 850 and the RRH 860 may be coupled to each other via a high speed line such as an optical fiber cable.

Each of the antennas 840 includes a single or two or more antenna elements (for example, two or more antenna elements that configure an MIMO antenna), and is used for the RRH 860 to transmit and receive radio signals. The eNB 830 may include two or more antennas 840 as illustrated in FIG. 22, and the two or more antennas 840 may respectively correspond to two or more frequency bands to be used by the eNB 830. It is to be noted that although FIG. 22 illustrates an example in which the eNB 830 includes the two or more antennas 840, the eNB 830 may include a single antenna 840.

The base station apparatus 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 21.

The wireless communication interface 855 supports any cellular communication scheme such as LTE, LTE-Advanced, or the like, and provides wireless coupling to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 21, except that the BB processor 856 is coupled to an RF circuit 864 of the RRH 860 via the coupling interface 857. The wireless communication interface 855 may include two or more BB processors 856 as illustrated in FIG. 22, and the two or more BB processors 856 may respectively correspond to two or more frequency bands to be used by the eNB 830. It is to be noted that although FIG. 22 illustrates an example in which the wireless communication interface 855 includes the two or more BB processors 856, the wireless communication interface 855 may include a single BB processor 856.

The coupling interface 857 is an interface for coupling the base station apparatus 850 (the wireless communication interface 855) to the RRH 860. The coupling interface 857 may be a communication module for communication over the above-described high speed line that couples the base station apparatus 850 (the wireless communication interface 855) and the RRH 860 to each other.

Further, the RRH 860 includes a coupling interface 861 and a wireless communication interface 863.

The coupling interface 861 is an interface for coupling the RRH 860 (the wireless communication interface 863) to the base station apparatus 850. The coupling interface 861 may be a communication module for communication over the above-described high speed line.

The wireless communication interface 863 transmits and receives radio signals via the antenna 840. The wireless communication interface 863 may typically include the RF circuit 864 and the like. The RF circuit 864 may include a mixer, a filter, an amplifier, and the like, and transmits and receives radio signals via the antenna 840. The wireless communication interface 863 may include two or more RF circuits 864 as illustrated in FIG. 22, and the two or more RF circuits 864 may respectively correspond to the two or more antenna elements, for example. It is to be noted that although FIG. 22 illustrates an example in which the wireless communication interface 863 includes the two or more RF circuits 864, the wireless communication interface 863 may include a single RF circuit 864.

In the eNB 830 illustrated in FIG. 22, one or more components included in the base station 100 described with reference to FIG. 2 (for example, at least one of the communication control section 151, the information acquisition section 153, or the notification section 155) may be implemented in the wireless communication interface 855 and/or the wireless communication interface 863. Alternatively, at least some of these components may be implemented in the controller 851. As an example, the eNB 830 may be equipped with a module including a part (for example, the BB processor 856) or all of the wireless communication interface 855 and/or the controller 851, and the above-described one or more components may be implemented in the module. In this case, the above-described module may store a program for causing the processor to function as the above-described one or more components (in other words, a program for causing the processor to execute operations of the above-described one or more components), and may execute the program. As another example, the program for causing the processor to function as the above-described one or more components may be installed in the eNB 830, and the wireless communication interface 855 (for example, the BB processor 856) and/or the controller 851 may execute the program. As described above, the eNB 830, the base station apparatus 850, or the above-described module may be provided as an apparatus including the above-described one or more components, and the program for causing the processor to function as the above-described one or more components may be provided. In addition, a readable recording medium in which the above-described program is recorded may be provided.

In addition, in the eNB 830 illustrated in FIG. 22, for example, the wireless communication unit 120 described with reference to FIG. 2 may be implemented in the wireless communication interface 863 (for example, the RF circuit 864). Further, the antenna unit 110 may be implemented in the antenna 840. Further, the network communication unit 130 may be implemented in the controller 851 and/or the network interface 853. Further, the storage unit 140 may be implemented in the memory 852.

5.2. Application Example Related to Terminal Apparatus

First Application Example

Figure 23:
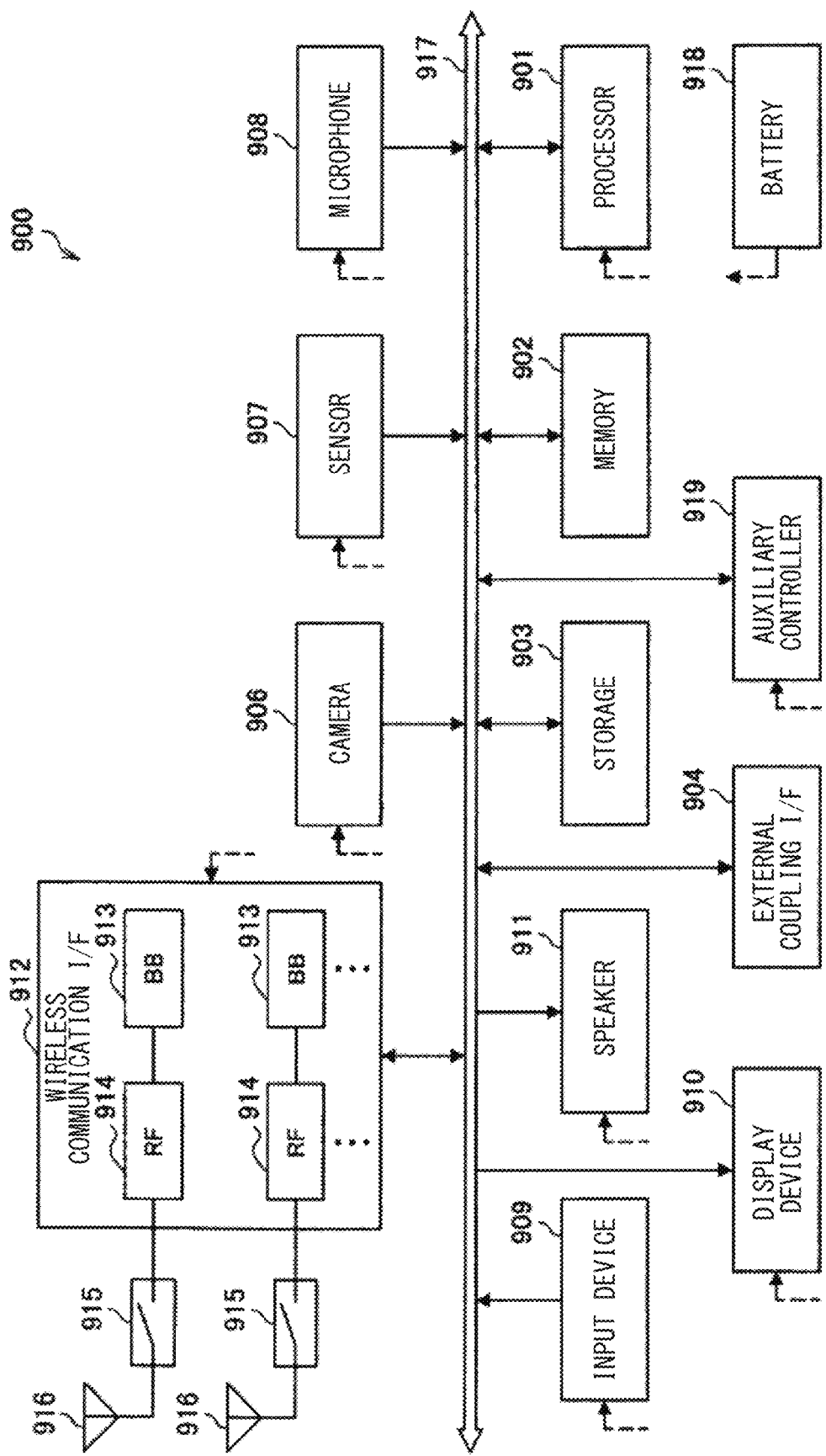
FIG. 23 is a block diagram illustrating an example of a schematic configuration of a smartphone.

FIG. 23 is a block diagram illustrating an example of a schematic configuration of a smartphone 900 to which the technology of the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or an SoC (System on Chip), and controls functions of an application layer and other layers of the smartphone 900. The memory 902 includes RAM and ROM, and stores a program to be executed by the processor 901, and data. The storage 903 may include a storage medium such as a semiconductor memory or a hard disk. The external coupling interface 904 is an interface for coupling an external device such as a memory card or a USB (Universal Serial Bus) device to the smartphone 900.

The camera 906 includes an imaging device such as a CCD (Charge Coupled Device) or a CMOS (Complementary Metal Oxide Semiconductor), and generates a captured image. The sensor 907 may include, for example, a group of sensors such as a positioning sensor, a gyro sensor, a geomagnetic sensor, and an acceleration sensor. The microphone 908 converts sounds that are input to the smartphone 900 to audio signals. The input device 909 includes, for example, a touch sensor that detects touch onto a screen of the display device 910, a keypad, a keyboard, a button, or a switch and the like, and receives an operation or an input of information from a user. The display device 910 includes a screen such as a liquid crystal display (LCD) or an organic light-emitting diode (OLED) display, and displays an output image from the smartphone 900. The speaker 911 converts audio signals that are outputted from the smartphone 900 into sounds.

The wireless communication interface 912 supports any cellular communication scheme such as LTE, LTE-Advanced, or the like, and performs wireless communication. The wireless communication interface 912 may typically include a BB processor 913, an RF circuit 914, and the like. The BB processor 913 may perform, for example, encoding/decoding, modulation/demodulation, multiplexing/demultiplexing and the like, and performs various signal processing for wireless communication. Meanwhile, the RF circuit 914 may include a mixer, a filter, an amplifier, and the like, and transmits and receives radio signals via the antenna 916. The wireless communication interface 912 may be a one-chip module with the BB processor 913 and the RF circuit 914 integrated thereon. The wireless communication interface 912 may include two or more BB processors 913 and two or more RF circuits 914 as illustrated in FIG. 23. It is to be noted that although FIG. 23 illustrates an example in which the wireless communication interface 912 includes the two or more BB processors 913 and the two or more RF circuits 914, the wireless communication interface 912 may include a single BB processor 913 or a single RF circuit 914.

Furthermore, the wireless communication interface 912 may support, in addition to the cellular communication scheme, another type of wireless communication scheme such as a short-distance wireless communication scheme, a near field wireless communication scheme, or a wireless LAN (Local Area Network) scheme. In that case, the wireless communication interface 912 may include the BB processor 913 and the RF circuit 914 for each wireless communication scheme.

Each of the antenna switches 915 switches coupling destinations of the antenna 916 between two or more circuits (for example, circuits for different wireless communication schemes) included in the wireless communication interface 912.

Each of the antennas 916 includes a single or two or more antenna elements (for example, two or more antenna elements that configure an MIMO antenna), and is used for the wireless communication interface 912 to transmit and receive radio signals. The smartphone 900 may include two or more antennas 916 as illustrated in FIG. 23. It is to be noted that although FIG. 23 illustrates an example in which the smartphone 900 includes the two or more antennas 916, the smartphone 900 may include a single antenna 916.

Furthermore, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 23 via feeder lines, which are partially illustrated in broken lines in the figure. The auxiliary controller 919 operates a minimum necessary function of the smartphone 900, for example, in a sleep mode.

In the smartphone 900 illustrated in FIG. 23, one or more components included in the terminal apparatus 200 described with reference to FIG. 3 (for example, at least any of the communication control section 241, the information acquisition section 243, and the notification section 247) may be implemented in the wireless communication interface 912. Alternatively, at least some of these components may be implemented in the processor 901 or the auxiliary controller 919. As an example, the smartphone 900 may be equipped with a module including a part (for example, the BB processor 913) or all of the wireless communication interface 912, the processor 901, and/or the auxiliary controller 919, and the above-described one or more components may be implemented in the module. In this case, the above-described module may store a program for causing the processor to function as the above-described one or more components (in other words, a program for causing the processor to execute operations of the above-described one or more components), and may execute the program. As another example, the program for causing the processor to function as the above-described one or more components may be installed in the smartphone 900, and the wireless communication interface 912 (for example, the BB processor 913), the processor 901, and/or the auxiliary controller 919 may execute the program. As described above, the smartphone 900 or the above-described module may be provided as an apparatus including the above-described one or more components, and the program for causing the processor to function as the above-described one or more components may be provided. In addition, a readable recording medium in which the above-described program is recorded may be provided.

In addition, in the smartphone 900 illustrated in FIG. 23, for example, the wireless communication unit 220 described with reference to FIG. 3 may be implemented in the wireless communication interface 912 (for example, the RF circuit 914). Further, the antenna unit 210 may be implemented in the antenna 916. Further, the storage unit 230 may be implemented in the memory 902.

Second Application Example

Figure 24:
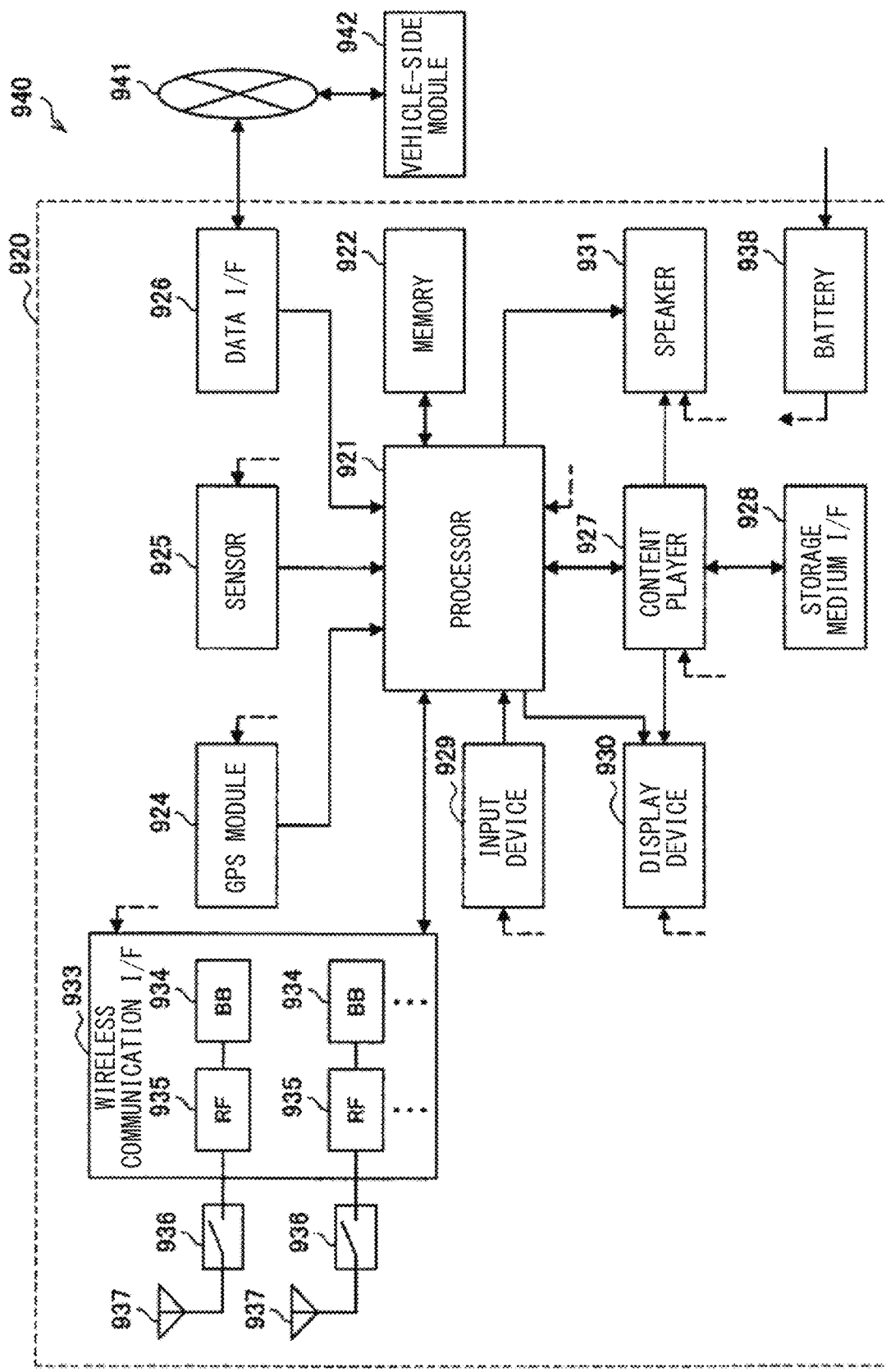
FIG. 24 is a block diagram illustrating an example of a schematic configuration of a car navigation apparatus.

FIG. 24 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation apparatus 920. The memory 922 includes RAM and ROM, and stores a program to be executed by the processor 921, and data.

The GPS module 924 measures a position (for example, latitude, longitude, and altitude) of the car navigation apparatus 920 by using GPS signals received from a GPS satellite. The sensor 925 may include, for example, a group of sensors such as a gyro sensor, a geomagnetic sensor, and a barometric sensor. The data interface 926 is coupled to, for example, an in-vehicle network 941 via a terminal that is not illustrated, and acquires data generated on the vehicle side, such as vehicle speed data.

The content player 927 reproduces content stored in a storage medium (for example, a CD or a DVD) that is inserted into the storage medium interface 928. The input device 929 includes, for example, a touch sensor that detects touch onto a screen of the display device 930, a button, or a switch and the like, and receives an operation or an input of information from a user. The display device 930 includes a screen such as an LCD or an OLED display, and displays an image of the navigation function or content that is reproduced. The speaker 931 outputs sounds of the navigation function or the content that is reproduced.

The wireless communication interface 933 supports any cellular communication scheme such as LTE, LTE-Advanced, or the like, and performs wireless communication. The wireless communication interface 933 may typically include a BB processor 934, an RF circuit 935, and the like. The BB processor 934 may perform, for example, encoding/decoding, modulation/demodulation, multiplexing/demultiplexing and the like, and performs various signal processing for wireless communication. Meanwhile, the RF circuit 935 may include a mixer, a filter, an amplifier, and the like, and transmits and receives radio signals via the antenna 937. The wireless communication interface 933 may be a one-chip module with the BB processor 934 and the RF circuit 935 integrated thereon. The wireless communication interface 933 may include two or more BB processors 934 and two or more RF circuits 935 as illustrated in FIG. 24. It is to be noted that although FIG. 24 illustrates an example in which the wireless communication interface 933 includes the two or more BB processors 934 and the two or more RF circuits 935, the wireless communication interface 933 may include a single BB processor 934 or a single RF circuit 935.

Furthermore, the wireless communication interface 933 may support, in addition to the cellular communication scheme, another type of wireless communication scheme such as a short-distance wireless communication scheme, a near field wireless communication scheme, a wireless LAN scheme, or the like. In that case, the wireless communication interface 933 may include the BB processor 934 and the RF circuit 935 for each wireless communication scheme.

Each of the antenna switches 936 switches coupling destinations of the antenna 937 between two or more circuits (for example, circuits for different wireless communication schemes) included in the wireless communication interface 933.

Each of the antennas 937 includes a single or two or more antenna elements (for example, two or more antenna elements that configure an MIMO antenna), and is used for the wireless communication interface 933 to transmit and receive radio signals. The car navigation apparatus 920 may include two or more antennas 937 as illustrated in FIG. 24. It is to be noted that although FIG. 24 illustrates an example in which the car navigation apparatus 920 includes the two or more antennas 937, the car navigation apparatus 920 may include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 24 via feeder lines that are partially illustrated in broken lines in the figure. Further, the battery 938 accumulates power supplied from the vehicle side.

In the car navigation apparatus 920 illustrated in FIG. 24, one or more components (for example, at least any of the communication control section 241, the information acquisition section 243, and the notification section 247) included in the terminal apparatus 200 described with reference to FIG. 3 described with reference to FIG. 3 may be implemented in the wireless communication interface 933. Alternatively, at least some of these components may be implemented in the processor 921. As an example, the car navigation apparatus 920 may be equipped with a module including a part (for example, the BB processor 934) or all of the wireless communication interface 933 and/or the processor 921, and the above-described one or more components may be implemented in the module. In this case, the above-described module may store a program for causing the processor to function as the above-described one or more components (in other words, a program for causing the processor to execute operations of the above-described one or more components), and may execute the program. As another example, the program for causing the processor to function as the above-described one or more components may be installed in the car navigation apparatus 920, and the wireless communication interface 933 (for example, the BB processor 934) and/or the processor 921 may execute the program. As described above, the car navigation apparatus 920 or the above-described module may be provided as an apparatus including the above-described one or more components, and the program for causing the processor to function as the above-described one or more components may be provided. In addition, a readable recording medium in which the above-described program is recorded may be provided.

In addition, in the car navigation apparatus 920 illustrated in FIG. 24, for example, the wireless communication unit 220 described with reference to FIG. 3 may be implemented in the wireless communication interface 933 (for example, the RF circuit 935). Further, the antenna unit 210 may be implemented in the antenna 937. Further, the storage unit 230 may be implemented in the memory 922.

Further, the technology according to the present disclosure may be realized as an in-vehicle system (or a vehicle) 940 including one or more blocks of the car navigation apparatus 920 described above, the in-vehicle network 941, and a vehicle-side module 942. The vehicle-side module 942 generates vehicle-side data such as vehicle speed, engine RPM, or trouble information and the like, and outputs the generated data to the in-vehicle network 941.

6. Conclusion

As described above, the embodiment of the present disclosure provides a terminal apparatus that is able to perform sensing of a resource effectively in NR V2X communication, and a base station apparatus that performs wireless communication with the terminal apparatus.

Although the description of the embodiment of the present disclosure has mainly been directed to V2X communication, it is needless to say that the present disclosure is not limited to such an example, and is also applicable to use cases other than V2X communication because it serves as an extension of sidelink. For example, it is possible to apply the technology described in the embodiment of the present disclosure to D2D communication, MTC communication, moving cells, relay communication, and the like. Further, the embodiment of the present disclosure may also be applied to multi-carrier communication in which sidelink communication is performed using two or more carriers.

The base station 100 illustrated in FIG. 2 may function as an example of a control apparatus of the present disclosure. Then, in the configuration of the base station 100 illustrated in FIG. 2, the wireless communication unit 120 may function as a communication unit of the control apparatus of the present disclosure, and the control unit 150 may function as a control unit of the control apparatus of the present disclosure.

The terminal apparatus 200 illustrated in FIG. 3 may function as an example of a communication apparatus of the present disclosure. In the configuration of the terminal apparatus 200 illustrated in FIG. 3, the wireless communication unit 220 may function as a communication unit of the communication apparatus of the present disclosure, and the control unit 240 may function as a control unit of the communication apparatus of the present disclosure. Further, the terminal apparatus 200 may be an apparatus provided in a mobile body. Then, the mobile body may be a vehicle.

The steps in the processing to be performed by each apparatus in the present specification may not necessarily be processed on a time-series basis in the order described in the sequence diagrams or flowcharts. For example, the steps in the processing to be performed by each apparatus may be processed in an order different from the order described in the flowcharts, or may be processed in parallel.

Furthermore, it is possible to produce a computer program that causes hardware such as a CPU, ROM, and RAM incorporated in each apparatus to perform functions equivalent to those of the configuration of each apparatus described above. In addition, it is also possible to provide a storage medium that stores the computer program. In addition, by configuring each of the functional blocks illustrated in the functional block diagrams by hardware, it is possible for a series of processes to be implemented by the hardware.

Although some preferred embodiments of the present disclosure have been described in detail above with reference to the accompanying drawings, the technical scope of the present disclosure is not limited to such examples. It is apparent that those having ordinary skill in the art of the present disclosure would easily arrive at various alterations or modifications within a scope of the technical idea described in the claims, and it is understood that such alternations or modifications naturally fall within the technical scope of the present disclosure.

Furthermore, the effects described herein are merely illustrative and exemplary, and not limiting. That is, the technology according to the present disclosure can exert other effects that are apparent to those skilled in the art from the description herein, in addition to the above-described effects or in place of the above-described effects.

It is to be noted that the following configurations also fall within the technical scope of the present disclosure.

(1)

A communication apparatus including:

an acquisition unit that acquires, from a base station apparatus, information for operating as a master for controlling a sidelink communication between other apparatuses; and a control unit that performs a process for operating as the master on a basis of the information acquired by the acquisition unit.

(2)

The communication apparatus according to (1), in which the acquisition unit acquires information for operating at any operation level among two or more operation levels as operation levels of the master.

(3)

The communication apparatus according to (2), in which the operation levels of the master include at least a first level corresponding to collecting and sharing with the other apparatuses information for the sidelink communication, a second level corresponding to limiting operations of the sidelink communication of the other apparatuses, and a third level corresponding to controlling the operations of the sidelink communication of the other apparatuses.

(4)

The communication apparatus according to (3), in which in a case of operating at the first level, the control unit shares with the other apparatuses information related to a use status of a resource used in the sidelink communication.

(5)

The communication apparatus according to (3), in which in a case of operating at the first level, the control unit performs sensing of the information to share with the other apparatuses.

(6)

The communication apparatus according to (3), in which in a case of operating at the first level, the acquisition unit acquires the information to share with the other apparatuses from another apparatus.

(7)

The communication apparatus according to (3), in which in a case of operating at the second level, the control unit limits a parameter related to the sidelink communication on the other apparatuses.

(8)

The communication apparatus according to (7), in which in the case of operating at the second level, the control unit supplies information for limiting a sensing region to the other apparatuses.

(9)

The communication apparatus according to (3), in which in a case of operating at the third level, the control unit controls a parameter related to the sidelink communication on the other apparatuses.

(10)

The communication apparatus according to (9), in which in the case of operating at the third level, the control unit executes a schedule of a resource for the sidelink communication on the other apparatuses.

(11)

A control apparatus including:

a control unit that sets information for a communication apparatus to operate as a master for controlling a sidelink communication between other apparatuses; and a communication unit that transmits the information set by the control unit to the communication apparatus to allow the communication apparatus to operate as the master.

(12)

The control apparatus according to (11), in which the communication unit transmits information for operating at any operation level among two or more operation levels as operation levels of the master.

(13)

The control apparatus according to (12), in which the operation levels of the master include at least a first level corresponding to collecting and sharing with the other apparatuses information for the sidelink communication, a second level corresponding to limiting operations of the sidelink communication of the other apparatuses, and a third level corresponding to controlling the operations of the sidelink communication of the other apparatuses.

(14)

The control apparatus according to (12) or (13), in which the control unit sets an operation performable by the mater for each of the operation levels.

(15)

The control apparatus according to any one of (12) to (14), in which if the communication apparatus to operate as the master is within a coverage, the communication unit transmits at least the operation level to the communication apparatus.

(16)

The control apparatus according to any one of (12) to (15), in which the communication unit transmits the information for operating at any operation level at a timing at which the communication apparatus couples to the control apparatus.

(17)

The control apparatus according to any one of (12) to (16), in which on a basis of position information of the communication apparatus to operate as the master, the control unit determines the operation level of the communication apparatus.

(18)

A communication apparatus including:

an acquisition unit that acquires, from a communication apparatus that operates as a master for controlling a sidelink communication with another apparatus, information related to the sidelink communication; and a control unit that performs a process related to the sidelink communication on a basis of the information acquired by the acquisition unit.

(19)

The communication apparatus according to (18), in which the control unit performs a process for discovering the communication apparatus that operates as the master prior to acquisition of the information related to the sidelink communication.

(20)

The communication apparatus according to (18) or (19), in which the control unit performs the sidelink communication using information shared by the communication apparatus.

(21)

The communication apparatus according to any one of (18) to (20), in which the control unit performs the sidelink communication on a basis of information limited by the communication apparatus.

(22)

The communication apparatus according to (21), in which the control unit performs the sidelink communication on a basis of a parameter related to the sidelink communication limited by the communication apparatus.

(23)
The communication apparatus according to any one of (18) to (20), in which the control unit performs the sidelink communication on a basis of information controlled by the communication apparatus.

(24)
The communication apparatus according to (23), in which the control unit performs the sidelink communication on a basis of a schedule of a resource for the sidelink communication controlled by the communication apparatus.

(25)
A communication system including:
a first communication apparatus that operates as a master for controlling a sidelink communication between other apparatuses from a base station apparatus;
a second communication apparatus that operates as a slave to undergo control by the first communication apparatus over the sidelink communication, in which
the first communication apparatus includes
an acquisition unit that acquires, from the base station apparatus, information for operating as the master,
a control unit that performs a process for operating as the master on a basis of the information acquired by the acquisition unit, and
the second communication apparatus includes
an acquisition unit that acquires information related to the sidelink communication from the first communication apparatus operating as the master, and
a control unit that performs a process related to the sidelink communication on a basis of the information acquired by the acquisition unit.

REFERENCE SIGNS LIST 1 system
100 base station
110 antenna unit
120 wireless communication unit
130 network communication unit
140 storage unit
150 control unit
151 communication control section
153 information acquisition section
155 notification section
200 terminal apparatus
210 antenna unit
220 wireless communication unit
230 storage unit
240 control unit
241 communication control section
243 information acquisition section
247 notification section

The invention claimed is:
1. A communication apparatus comprising:
circuitry that
acquires, from a base station apparatus, information for operating as a master for controlling a sidelink communication between other apparatuses; and
performs a process for operating as the master on a basis of the information acquired,
wherein the circuitry acquires information for operating at any operation level among two or more operation levels as operation levels of the master, and
the operation levels of the master include at least a first level corresponding to collecting and sharing with the other apparatuses information for the sidelink communication, a second level corresponding to limiting operations of the sidelink communication of the other apparatuses, and a third level corresponding to controlling the operations of the sidelink communication of the other apparatuses.

2. The communication apparatus according to claim 1, wherein in a case of operating at the first level, the circuitry shares with the other apparatuses information related to a use status of a resource used in the sidelink communication.

3. The communication apparatus according to claim 1, wherein in a case of operating at the first level, the circuitry performs sensing of the information to share with the other apparatuses.

4. The communication apparatus according to claim 1, wherein in a case of operating at the second level, the circuitry limits a parameter related to the sidel ink communication on the other apparatuses.

5. The communication apparatus according to claim 4, wherein in the case of operating at the second level, the circuitry supplies information for limiting a sensing region to the other apparatuses.

6. The communication apparatus according to claim 1, wherein in a case of operating at the third level, the circuitry controls a parameter related to the sidel ink communication on the other apparatuses.

7. The communication apparatus according to claim 6, wherein in the case of operating at the third level, the circuitry executes a schedule of a resource for the sidelink communication on the other apparatuses.

8. A control apparatus comprising:
circuitry that
sets information for a communication apparatus to operate as a master for controlling a sidelink communication between other apparatuses; and
transmits the information set by the circuitry to the communication apparatus to allow the communication apparatus to operate as the master,
wherein the circuitry transmits information for operating at any operation level among two or more operation levels as operation levels of the master, and
the operation levels of the master include at least a first level corresponding to collecting and sharing with the other apparatuses information for the sidelink communication, a second level corresponding to limiting operations of the sidelink communication of the other apparatuses, and a third level corresponding to controlling the operations of the sidelink communication of the other apparatuses.

9. The control apparatus according to claim 8, wherein the circuitry sets an operation performable by the master for each of the operation levels.

10. The control apparatus according to claim 8, wherein if the communication apparatus to operate as the master is within a coverage, the circuitry transmits at least the operation level to the communication apparatus.

11. The control apparatus according to claim 8, wherein the circuitry transmits the information for operating at any operation level at a. timing at which the communication apparatus couples to the control apparatus.

12. The control apparatus according to claim 8, wherein on a basis of position information of the communication apparatus to operate as the master, the circuitry determines the operation level of the communication apparatus.

13. A communication apparatus comprising:
circuitr that
acquires, from a communication apparatus that operates as a master for controlling a sidelink communication with another apparatus, information related to the sidelink communication; and
performs a process related to the sidelink communication on a basis of the information acquired,
wherein the circuitry acquires information for operating at any operation level among two or more operation levels as operation levels of the master, and
the operation levels of the master include at least a first level corresponding to collecting and sharing with the other apparatuses information for the sidel ink communication, a second level corresponding to limiting operations of the sidelink communication of the other apparatuses, and a third level corresponding to controlling the operations of the sidelink communication of the other apparatuses.

14. The communication apparatus according to claim 13, wherein the circuitry performs a process for discovering the communication apparatus that operates as the master prior to acquisition of the information related to the sideiink communication.

15. The communication apparatus according to claim 13, wherein the circuitry performs the sidelink communication using information shared by the communication apparatus.

16. The communication apparatus according to claim 13, wherein the circuitry performs the sidelink communication on a basis of information limited by the communication apparatus.

* * * * *